US008638470B2

(12) United States Patent
Thomas et al.

(10) Patent No.: US 8,638,470 B2
(45) Date of Patent: Jan. 28, 2014

(54) EFFICIENT BANDED HYBRID RENDERING

(75) Inventors: Thomas Benjamin Sanjay Thomas, Kingsgrove (AU); David Christopher Smith, Bridgewater (AU)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 12/595,796

(22) PCT Filed: Jun. 27, 2008

(86) PCT No.: PCT/AU2008/000947
§ 371 (c)(1),
(2), (4) Date: Nov. 6, 2009

(87) PCT Pub. No.: WO2009/003221
PCT Pub. Date: Jan. 8, 2009

(65) Prior Publication Data
US 2010/0091310 A1    Apr. 15, 2010

(30) Foreign Application Priority Data
Jun. 29, 2007    (AU) ................. 2007203061

(51) Int. Cl.
G06F 3/12 (2006.01)
G06K 15/00 (2006.01)
B41J 9/44 (2006.01)
B41J 11/44 (2006.01)

(52) U.S. Cl.
USPC ......... 358/1.9; 358/1.15; 358/1.16; 358/1.17; 358/1.13; 400/61; 400/70; 400/76

(58) Field of Classification Search
USPC ........ 358/1.15, 1.16, 1, 9, 1.17, 1.13; 400/61, 400/70, 76
See application file for complete search history.

(56) References Cited

U.S. PATENT DOCUMENTS

| 5,594,860 | A | | 1/1997 | Gauthier | 395/501 |
|---|---|---|---|---|---|
| 5,913,018 | A | * | 6/1999 | Sela | 358/1.17 |
| 5,988,899 | A | * | 11/1999 | Benson et al. | 400/61 |
| 6,891,536 | B2 | | 5/2005 | Smith | 345/421 |

(Continued)

OTHER PUBLICATIONS

WIPO, International Preliminary Search Report on Patentability for PCT/AU2008/000947, Jan. 5, 2010.

(Continued)

Primary Examiner — Akwasi M Sarpong
(74) Attorney, Agent, or Firm — Fitzpatrick, Cella, Harper & Scinto

(57) ABSTRACT

Disclosed is a method of band rendering an image. The method comprises receiving (201) object data of the image in the page description language. From this the method determines a plurality of buckets (bucket #1-#3, FIG. 14) by which the object data is to be divided. The method then assigns (FIG. 3, 350) object data of each object in the image to one of the buckets based on an initial visibility of the object in the image. Then, for each band of the image, in a band sequential fashion (900, 920), the method identifies (1016-1024) object data visible within a band from a subset of the buckets active for the band. Then, the method analysis (FIGS. 10(*i*)-(*iii*); 1028-1052) the identified object data within the band and selects at least one rendering method (RCCR, PCR) from a plurality of rendering methods by which the band is to be rendered. Then the method renders (960,970) the identified object data into the band from the object data using the selected at least one rendering method.

27 Claims, 18 Drawing Sheets

(56) References Cited

U.S. PATENT DOCUMENTS

| | | | |
|---|---|---|---|
| 7,113,302 B2 | 9/2006 | Reddy et al. | 358/1.15 |
| 7,286,142 B2 | 10/2007 | Smith et al. | 345/629 |
| 7,477,265 B2 | 1/2009 | Smith et al. | 345/629 |
| 2003/0095285 A1* | 5/2003 | Reddy et al. | 358/1.16 |
| 2006/0001681 A1 | 1/2006 | Smith | 345/629 |
| 2008/0297833 A1* | 12/2008 | Hatakeyama | 358/1.15 |

OTHER PUBLICATIONS

International Search Report and Written Opinion dated Sep. 5, 2008 in International Application No. PCT/AU2008/000947, filed Jun. 27, 2008.

* cited by examiner

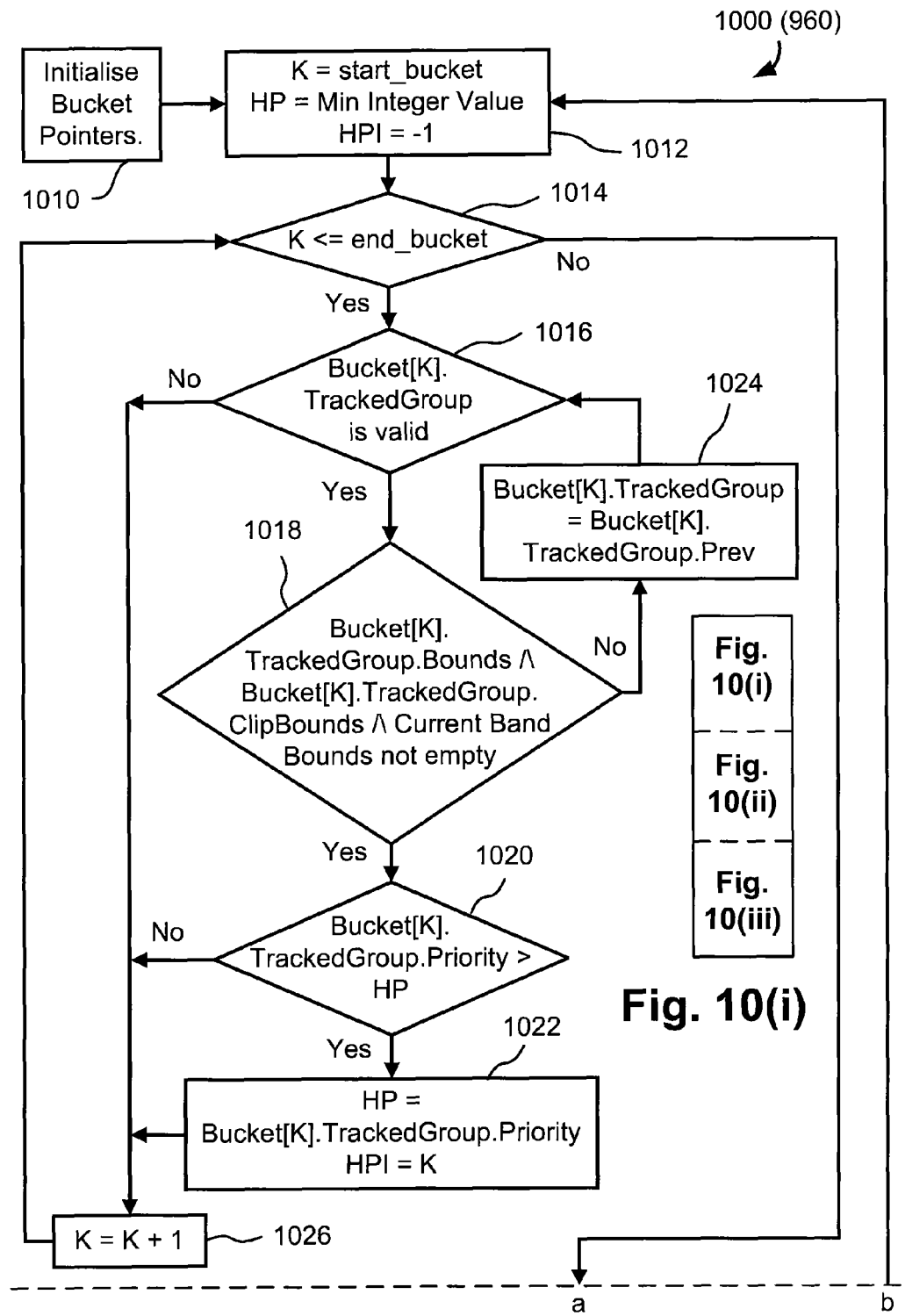

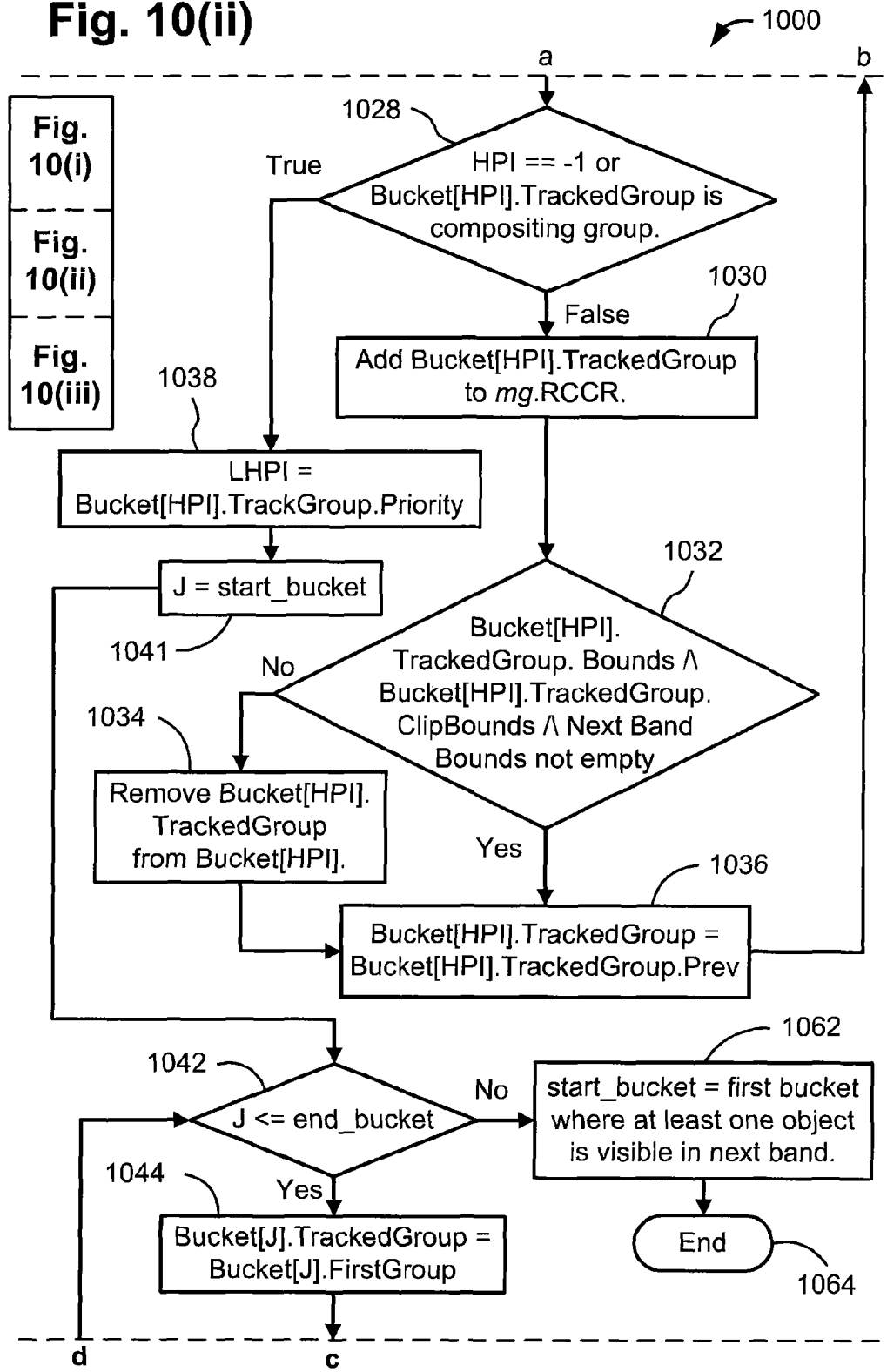

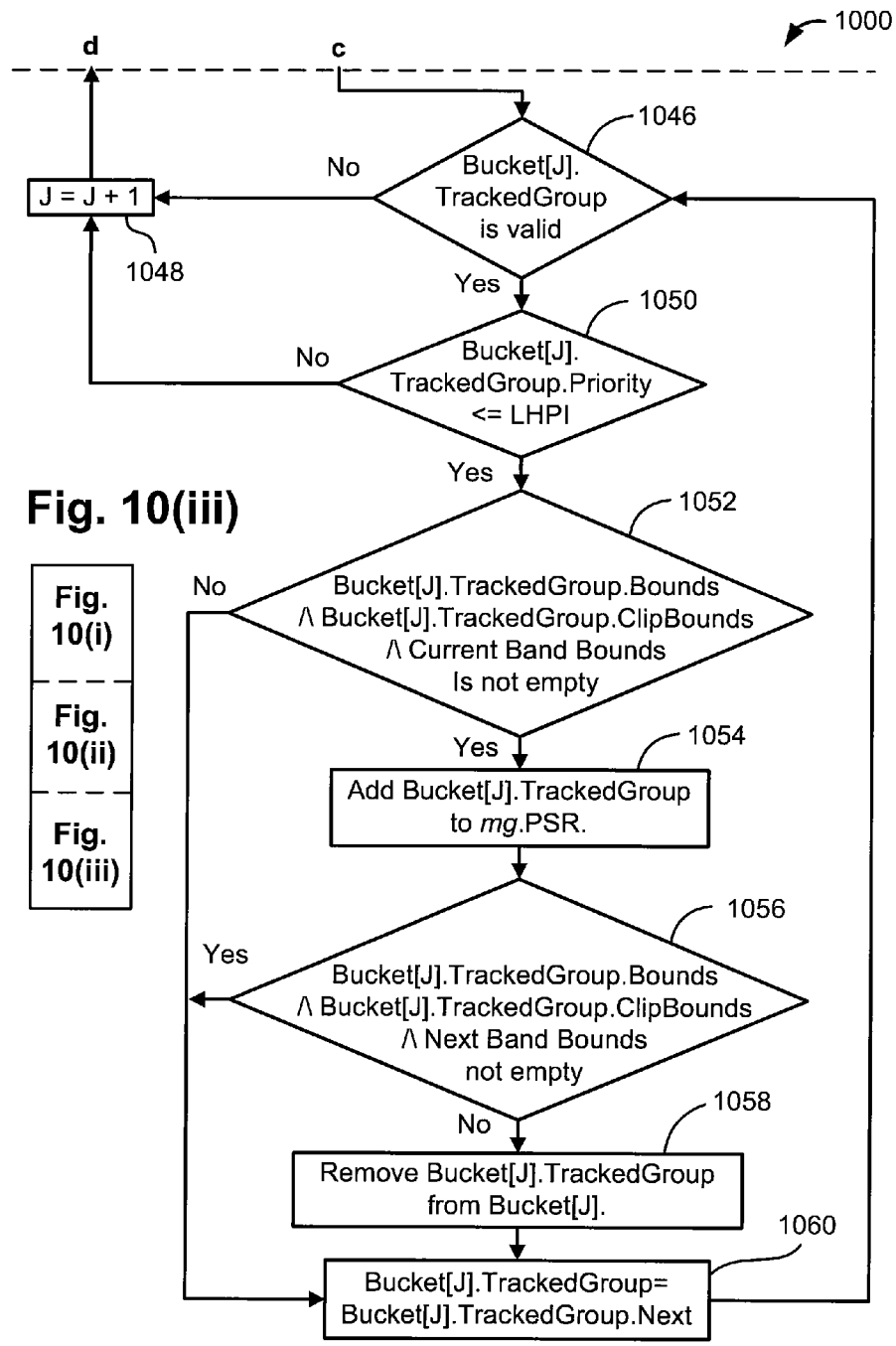

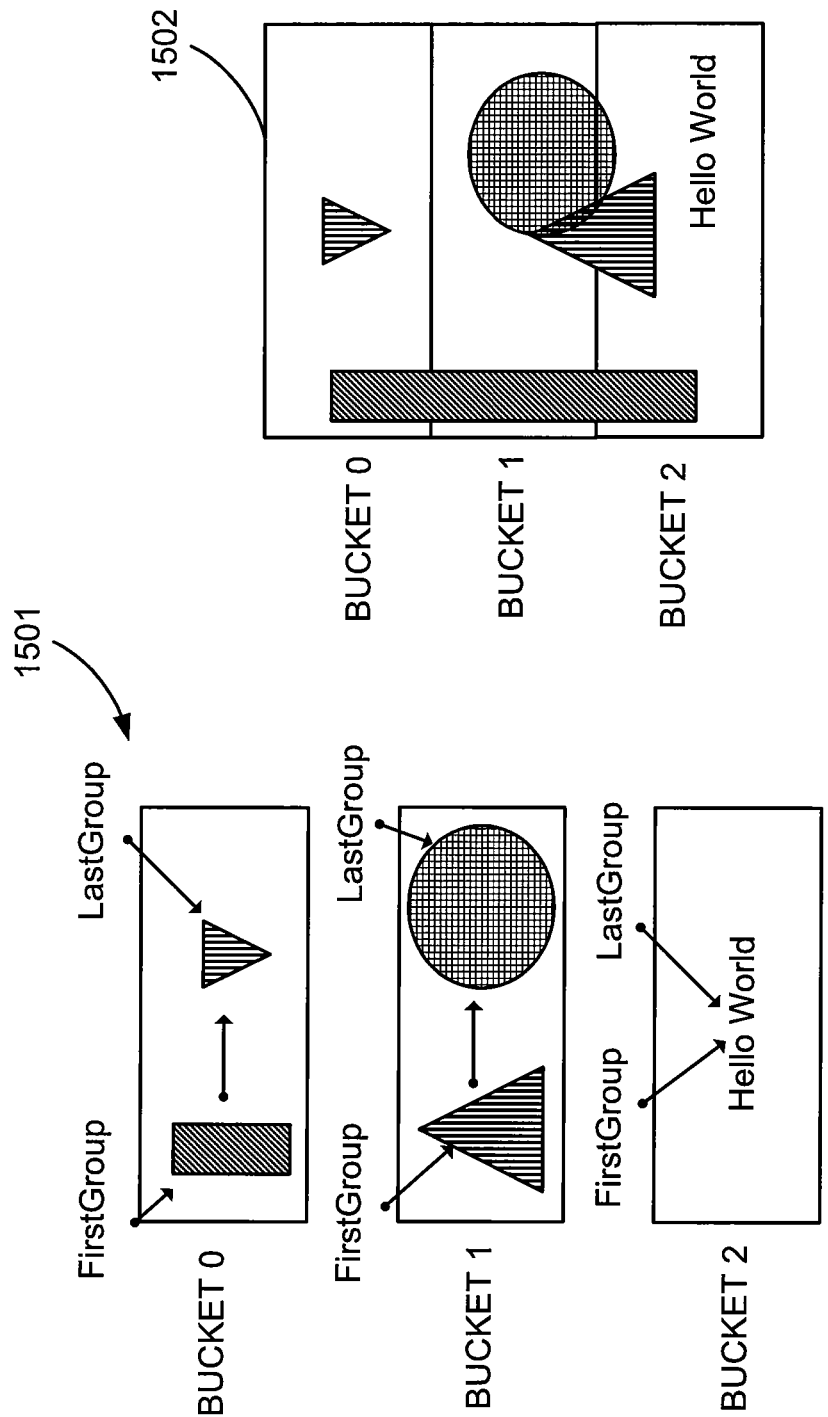

EFFICIENT BANDED HYBRID RENDERING

TECHNICAL FIELD

The current invention relates to graphic object rendering and in particular to rendering to a band buffer using a hybrid of object-sequential and pixel-sequential rendering.

BACKGROUND

When a computer application provides data of a page to a device for printing and/or display, an intermediate description of the page is often given to device driver software in a page description language (PDL). The intermediate description of the page includes descriptions of the graphic objects to be rendered. This contrasts with some arrangements where raster image data is generated directly by the application and transmitted for printing or display. Examples of page description languages include LIPS™ (Canon Inc. of Japan) and PCL™ (Hewlett-Packard Inc. of USA).

Equivalently, the application may provide a set of descriptions of graphic objects via function calls to a graphics device interface layer (GDI), such as the Microsoft Windows™ GDI (Microsoft Corp. of USA). The printer driver for the associated target printer is the software that receives the graphic object descriptions from the GDI layer. For each graphic object, the printer driver is responsible for generating a description of the graphic object in the page description language that is understood by the rendering system of the target printer.

The rendering system of the printer contains a PDL interpreter that parses the graphic object descriptions and builds a display list (DL) of graphic object data. The rendering system also contains a raster image processor (RIP) that processes the display list and renders the data to an output page image of pixel values The pixel values typically comprise for example cyan (C), magenta (M), yellow (Y) and black (K) colour channels. Once in this format, the printer prints the page.

A graphic object can be a fill region, which (potentially) contributes colour to the output image, or a clip region. Hereinafter, "graphic object" will be taken to mean "fill region".

Each graphic object may further be affected, modified or "clipped" by a clip region. The clip region limits the graphic objects it clips to the boundaries of the clip region. The clip region may describe a rectangular shape, called a clip rectangle, or describe a more complex shape, called a clip path.

There are two types of clip regions. Inclusive clip regions, called "clip-ins", are where graphic objects are only drawn inside the boundaries of the clip region. Exclusive clip regions, called "clip-outs", are where graphic objects are only drawn outside the boundaries of the clip region.

The clip region (or simply "clip") may be applied to a single graphic object or a group of graphic objects. A clip region that clips a group of graphic objects is deemed to be "active" over the group of graphic objects. Furthermore, a graphic object or group of graphic objects may be clipped by two or more clip regions. A graphic object's "clipping status" is the list of clips that clip that graphic object.

Most RIPs utilize a large volume of memory, known in the art as a frame store or a page buffer, to hold a pixel-based image data representation of the page or screen for subsequent printing and/or display. Typically, the outlines of the graphic objects are calculated, filled with colour values and written into the frame store. For two-dimensional computer graphics, objects that appear in front of other objects are simply written into the frame store after the background objects, thereby replacing the background on a pixel by pixel basis. This is commonly known in the art as "Painter's algorithm"; also as "object-sequential rendering". Objects are considered in priority order, from the rearmost object to the foremost object, and typically, each object is rasterised in scanline order and pixels are written to the frame store in sequential runs along each scanline. These sequential runs are termed "pixel runs". Some RIPS allow objects to be composited with other objects in some way. For example, a logical or arithmetic operation can be specified and performed between one or more semi-transparent graphic objects and the already rendered pixels in the frame buffer. In these cases, the rendering principle remains the same: objects are rasterised in scanline order, and the result of the specified operation is calculated and written to the frame store in sequential runs along each scanline.

There are a number of problems with the Painter's algorithm rendering method. One of the problems is that many pixels which are written to the framestore by rasterising an object are subsequently over-written when rasterising later objects. There is a clear disadvantage in using resources to write pixel data into a framestore that will, at a later stage, be over-written.

Another problem is that when an object requires compositing, pixels beneath the object are typically read from the framestore and combined in some way with the pixels of the object. If the pixels in the framestore are stored in a lower bit-depth than the object requiring compositing, then most compositing operations generate an incorrect result. This is the case when the graphics object is, for example, an 8 bit per channel RGBA bitmap and the framestore holds one bit per channel half-toned pixel data. This can occur because pixel values are often stored in a framestore at the bit depth required for printing. Although it is possible to store pixels at the full bit depth of the original object fills, e.g. 8 or more bits per channel, an 8 bit per channel RGBA framestore at 600 dpi resolution requires over 100 MB of memory for an A4 page. Also, once the page is rendered to the 8 bit per channel framestore, it must still be converted to the lower bit depth for printing, which is inefficient.

Other RIPs may utilise a pixel-sequential rendering approach to remove the need for a framestore. In these systems, each pixel is generated in raster order along scanlines. All objects to be drawn are retained in a display list in an edge-based format. On each scanline, the edges of objects that intersect the current scanline, known as active edges, are held in increasing order of their points of intersection with the scanline. These points of intersection, or edge crossings, are considered in turn, and activate or deactivate objects in the display list. Between each pair of edges considered, the colour data for each pixel which lies between the first edge and the second edge is generated based on which objects are active for that run of pixels. In preparation for the next scanline, the coordinate of intersection of each edge is updated in accordance with the properties of each edge, and the edges are sorted into increasing order of point of intersection with that scanline. Any newly active edges are also merged into the ordered list of active edges. Graphics systems which use pixel-sequential rendering have significant advantages over object-sequential renderers in that there is no frame store or line store and no unnecessary over-painting. Objects requiring compositing are processed on a per-pixel basis using each object's original colour data. Each pixel is converted to the output bit depth after any compositing, so the correct result is obtained regardless of the output bit depth.

Pixel-sequential rendering suffers when there are large numbers of edges that must be tracked and maintained in sorted order for each scanline. As each edge is updated for a new scanline, the edge is re-inserted into the active edge list, usually by an insertion sort. For complex pages, which may consist of hundreds of thousands of edges, the time required to maintain the sorted list of active edges for each scanline becomes a large portion of the total time to render a complex page.

In a situation where a framestore of less than full bit depth is available, a "hybrid" rendering approach may be employed. The display list is partitioned into one or more groups of objects requiring compositing, and one or more groups of objects not requiring compositing. Pixel-sequential rendering is used for the groups of objects requiring compositing, and object-sequential rendering is used for the remaining object groups. Another alternative to overcome memory constraints is to store only a portion, or band, of the full bit depth output image in memory at any one time. Conventional "banded renderers" render the display list to the band buffer or "band store", one band at a time, starting at the top and working consecutively down the page. While this requires no modification to a pixel-sequential renderer, it is highly inefficient to employ a conventional object-sequential renderer in this fashion, as the entire display list must be traversed once for each band. Additionally, it is inefficient to perform object-sequential compositing to a bandstore, particularly when the objects are specified at lower bit depth than the bandstore. A hybrid renderer employing a conventional object-sequential renderer to render objects not requiring compositing would remove this latter inefficiency, but would still inherit at least part of the former inefficiency.

In a Painter's algorithm RIP, there are a number of approaches to dealing with clipping regions. In one approach, the clip region is divided into multiple clip rectangles, where each rectangle is a single scanline high. As the graphic object is rasterized, each determined pixel-run is intersected with any clipping rectangles present on that scanline, and only those pixels within the clipping rectangles are output. In another approach, both the edges of the graphic object and the edges that define the clipping region(s) are scan converted using active edge list (AEL) techniques. A global clip-counter is maintained and typically set to zero at the start of each scanline. Edges are processed on each scanline in increasing x-order. When an edge is processed that activates a clipping region, the clip-counter is incremented. Similarly, when an edge is processed that deactivates a clipping region, the clip-counter is decremented. Pixels are only output between edge pairs inside a graphic object when the clip-counter is equal to the number of active clip regions clipping this graphic object.

Regardless of which approach is used, in a Painter's algorithm RIP each graphic object, from rearmost to foremost, must be clipped by all active clip regions before that graphic object is output to the frame store. In the case where a clip region clips all graphic objects on the page, then that clip region is typically processed as many times as there are graphic objects on the page.

In a pixel-sequential RIP, clipping is typically achieved through the use of a clip list, which is a list of pointers to all graphic objects that are clipped by the clip region. Each clip region has a clip list. Each graphic object also has a clip-count property, which is initialised to the number of clip regions that clip this graphic object.

Each time a clip region is activated or deactivated on a scanline, the associated clip list is traversed, and each graphic object's clip-count is decremented on activation, or incremented on deactivation. A graphic object then only contributes pixels to a pixel-run between two edge pairs when the graphic object's clip-count is zero. So, in the simplest case of a rectangular clip region, the clip-counts of all graphic objects clipped by the clip region are modified twice per scanline over the number of scanlines that the clip region is active. They are clipped once when the clip becomes active on a scanline, and again when the clip becomes inactive on a scanline.

Although a pixel-sequential RIP has the advantage that a clip region is processed only once, it can be seen that the performance of such a RIP can degrade substantially when the number of entries in the clip list is large, and when the clip region itself has a large number of edge crossings per scanline.

SUMMARY

It is an object of the present invention to overcome, or at least ameliorate, one or more disadvantages of existing arrangements for rendering page descriptions.

Disclosed are arrangements including a method for constructing a partitioned display list so that successive bands of the output page image may be efficiently and accurately rendered to a bandstore. Also disclosed is a method of rendering such a partitioned display list using a hybrid rendering approach that handles clip regions efficiently.

In accordance with one aspect of the present disclosure there is provided a method of band rendering an image, said method comprising the steps of:

receiving object data of the image in the page description language;

determining a plurality of buckets by which the object data is to be divided;

assigning object data of each object in the image to one of said buckets based on an initial visibility of the object in the image; and for each band, in a band sequential fashion:

identifying object data visible within a band from a subset of said buckets active for the band;

analysing said identified object data within the band and selecting at least one rendering method from a plurality of rendering methods by which the band is to be rendered; and rendering the identified object data into the band from said object data using said selected at least one rendering method.

In accordance with another aspect of the present disclosure there is provided a method of constructing a partitioned display list comprising a plurality of objects to be rendered to an image comprising a plurality of scanlines, said method comprising:

(a) partitioning said display list into a plurality of buckets, each said bucket corresponding to one or more contiguous scanlines, and for each said object:

(i) identifying a highest priority object group in a said bucket corresponding to the first scanline on which said object is visible; and (ii) adding, if predetermined grouping criteria are met, said object to said object group.

In accordance with another aspect of the present disclosure, there is provided a method of rendering a partitioned display list to an output image comprising a plurality of scanlines, said image being divided into a plurality of bands of contiguous scanlines, said partitioned display list comprising a plurality of buckets, each said bucket corresponding to one or more contiguous scanlines and containing one or more objects, said method comprising, for a current band of said plurality of bands:

(a) determining a contiguous range of buckets containing at least one object that is visible within said band;

(b) determining the priority of a highest priority non-opaque object of the buckets in said range of buckets;

(c) rendering to said band all objects in said range of buckets with priority less than or equal to said determined priority that are visible in said band using a pixel-sequential approach; and (d) rendering to said band all remaining objects in said range of buckets that are visible in said band.

Other aspects are also disclosed.

BRIEF DESCRIPTION OF THE DRAWINGS

At least one embodiment of the present invention will now be described with reference to the following drawings, in which:

FIGS. 10($i$) to 10($iii$) together are a schematic flow diagram illustrating a method of creating metagroups for a current band, as used in the method of FIG. 9;

FIGS. 14A to 16B illustrate an example of operation of rendering a page according to the present disclosure.

DETAILED DESCRIPTION INCLUDING BEST MODE

Figure 1:
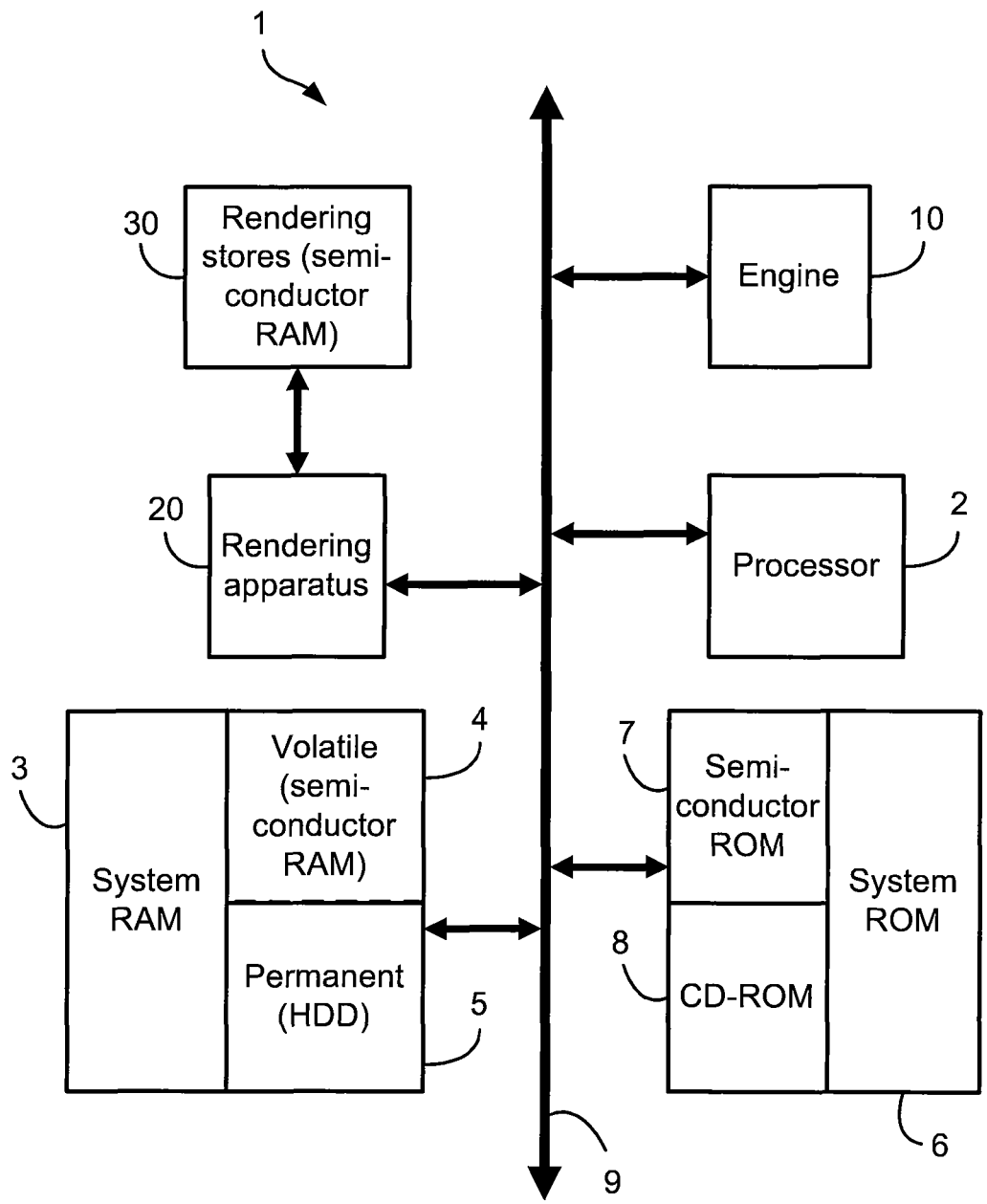
FIG. 1 is a schematic block diagram of a computer system on which the embodiments of the invention may be practised.

FIG. 1 illustrates schematically a system 1 configured for rendering and presenting computer graphic object images, on which the embodiments of the present invention may be practised. The system includes a processor 2. The processor 2 is also associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8 or DVD devices (not illustrated). The system 1 may also incorporate an engine 10, such as a print engine.

The above-described components of the system 1 are interconnected via a bus system 9 and are operable in a normal operating mode of computer systems well known in the art.

Also seen in FIG. 1, a rendering apparatus 20 connects to the bus 9, and is configured for the rendering of pixel-based images derived from graphic object-based descriptions supplied with instructions and data from the processor 2 via the bus 9. The apparatus 20 may utilise the system RAM 3 for the rendering of object descriptions. In some implementations the rendering apparatus 20 may have associated therewith a dedicated rendering store arrangement 30, typically formed of semiconductor RAM. The system 1 may be implemented within a printer or in a general purpose computer system.

The rendering apparatus 20 may be implemented as a hardware device. Alternatively, the rendering apparatus 20 may be a software module, for example stored on a computer readable medium such as a hard disk drive, an optical disk, or in dedicated memory devices such as EPROM. The software is executable by the processor 2 to implement a rendering system for graphic object-based images.

Figure 2:
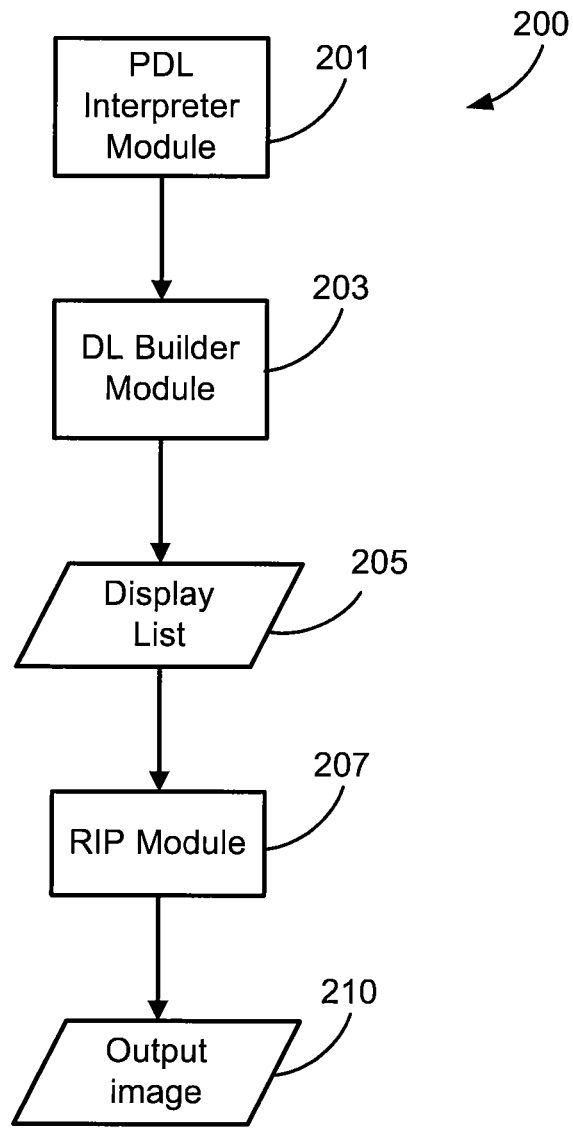
FIG. 2 is a schematic block diagram showing a rendering pipeline within which the embodiments of the invention may be implemented.

A rendering pipeline 200 within which the embodiments of the invention may be implemented is illustrated in FIG. 2. The pipeline 200, is implemented by hardware or software, or a combination of the two within the system 1. A PDL Interpreter module 201 converts graphic objects and clip regions described as object data in some page description language to a form that can be understood by a Display List Builder module 203. The Display List Builder Module 203 could also receive input in the form of function calls to the GDI interface.

The Display List Builder module 203 constructs a display list 205 of graphic objects in a form that is optimised for rendering by a RIP module 207. The RIP module 207 performs band rendering of the display list 205 to form an output pixel-based image 210.

The PDL interpreter module 201 and Display List Builder module 203 are preferably implemented as driver software modules running on a host PC processor that is in communication with system 1. Alternatively, they may be implemented as embedded software modules running on the processor 2 within the (printing) system 1. The RIP module 207 is implemented on the rendering apparatus 20 in system 1, which can be a hardware device or a software module as described above. The RIP module 207 preferably includes one or more special purpose renderers called "Ripettes" whose purpose will be explained below. The software modules may be represented by computer program code stored upon a storage medium, such as the HDD 5 or an optical disk such as a CD-ROM or DVD.

Figure 3:
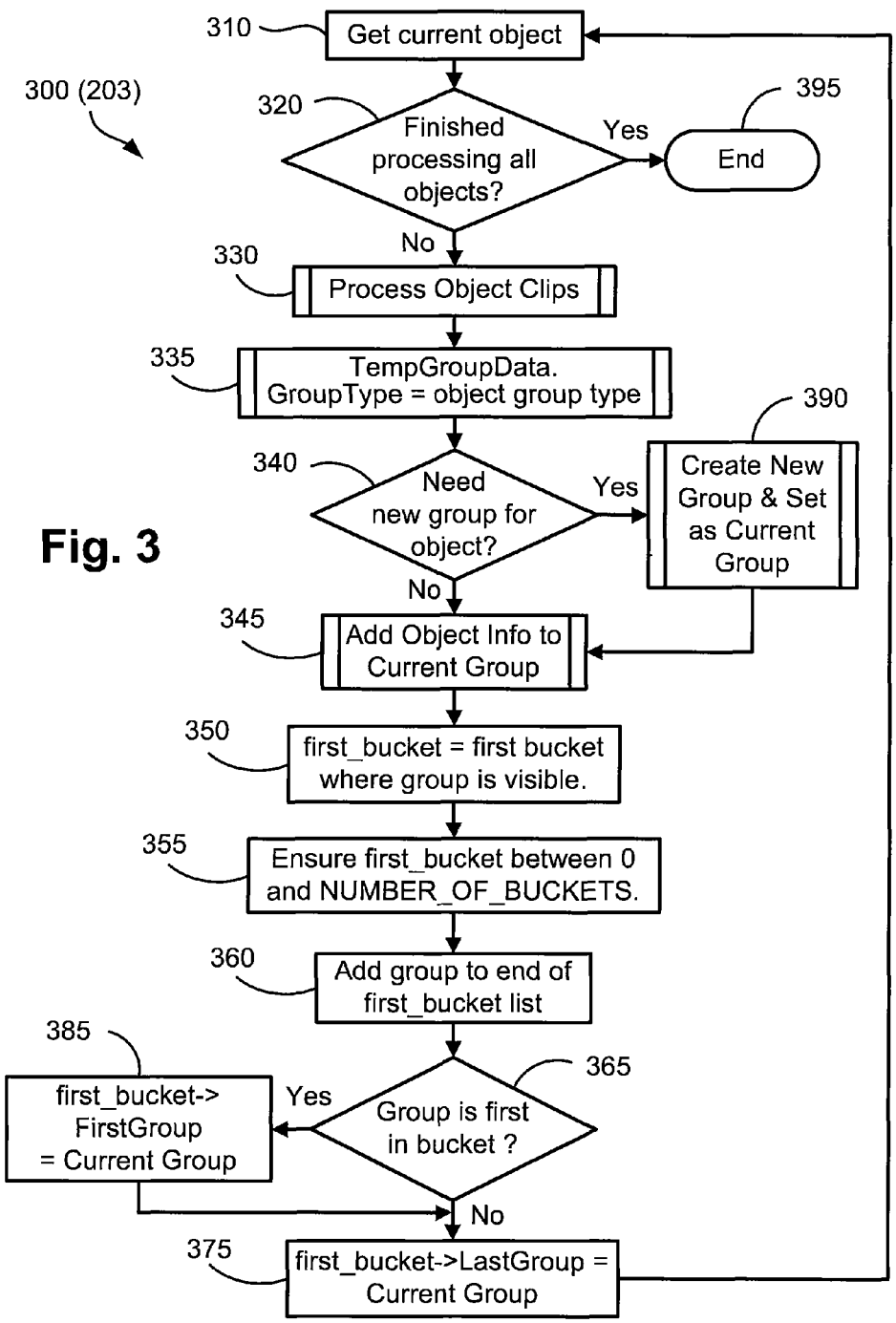
FIG. 3 is a schematic flow diagram illustrating a method of constructing a partitioned display list according to one embodiment of the invention.

The operation of the display list builder module 203 will now be described with reference to FIG. 3. FIG. 3 is a schematic flow diagram illustrating a method 300 of constructing a partitioned display list, carried out by the display list builder module 203. Method 300 partitions the display list into a number of partitions called buckets, each of which corresponds to one or more contiguous scanlines in the output image 210. This may be considered as one display list divided amongst the buckets, or a separate display list for each of the buckets. The partitioning is even so every bucket "contains" or otherwise represents the same number of scanlines. The number of buckets, NUMBER_OF_BUCKETS, can vary from page to page and may be set depending on various characteristics factors of the page or other factors being rendered. Some of those characteristics and factors include dots per inch (DPI) of printer resolution, page resolution, complexity of the page, processor speed, available cache and memory for example. NUMBER_OF_BUCKETS should be at least two, and is unrelated to the number of bands into which the image is divided for rendering. For example, there may be two buckets and a single band, or ore typically, a first plurality of buckets and a second, larger, plurality of bands. NUMBER_OF_BUCKETS is typically based on a value determined from the parameters mentioned above, and varied according to the complexity of the page image and the object data. The number of bands may vary, but is typically set for any image rendering system based upon the memory limitations available. For example if it is desired to render a 100 Mbyte page image and only 10 Mbyte is available for rendering operations, then dividing the image into 10 bands is appropriate. After the execution of method 300, each bucket contains zero or more object groups arranged in a list by ascending priority order. A group is assigned to exactly one bucket, namely the first bucket in scanline order in which at least one object in the group is visible. Groups comprise objects in ascending priority order that meet certain predetermined grouping criteria.

Method 300 begins at step 310 where an object (the current object) is received from the PDL interpreter module 201. At step 320, the method 300 tests whether all objects have been processed. If so, method 300 ends at step 395. Otherwise, method 300 proceeds to step 330 where the clips of the current object are processed, as described below with reference to FIG. 4. At the next step 335 a group type of the current object is determined as described below with reference to FIG. 7, and assigned to the GroupType field of a variable TempGroupData. The "type" of an object may be determined by one of a number of characteristics such as opacity, glyph or thin lines. Step 340 follows, where method 300 determines whether a new group needs to be opened for the current object, according to several grouping criteria. Step 340 will be described below in greater detail with reference to FIG. 5. If a new group needs to be opened, step 390 creates a new group and sets it to be the current group, as described below with reference to FIG. 8. If a new group is not needed, or following step 390, the method 300 then at step 345 adds information about the current object to the current group, as described below with reference to FIG. 6. At the following step 350, the index of the first bucket down the page where the current group is visible is calculated and assigned to a variable first_bucket. A group is visible within a bucket if at least one of the objects in the group intersects at least one scanline within the bucket. Step 350 therefore finds the first scanline on which any object in the current group is visible. Step 350 also divides the first scanline by the number of scanlines on the page, multiplies the result with the number of buckets, rounds downward, and stores the final result as a variable called first_bucket. This establishes for each group, the identity of the first bucket in which that group is visible, noting that the group may have visibility in one or more consecutive subsequent buckets. The following step 355 ensures the result is in the range [0, NUMBER_OF_BUCKETS−1] by clamping first_bucket to the nearer end point of that range. At the next step 360, the current group is added (if it has not already been added) to the end of the list of groups in the bucket indexed by first_bucket. If the current group is the first group in the bucket, as determined in (step 365, step 385 sets the FirstGroup field of the bucket indexed by first_bucket to the current group. Next, or otherwise, the LastGroup field of the bucket indexed by first_bucket is set at step 375 to the current group. Method 300 then returns to step 310 to await the next object from the PDL interpreter module 201.

Figure 4:
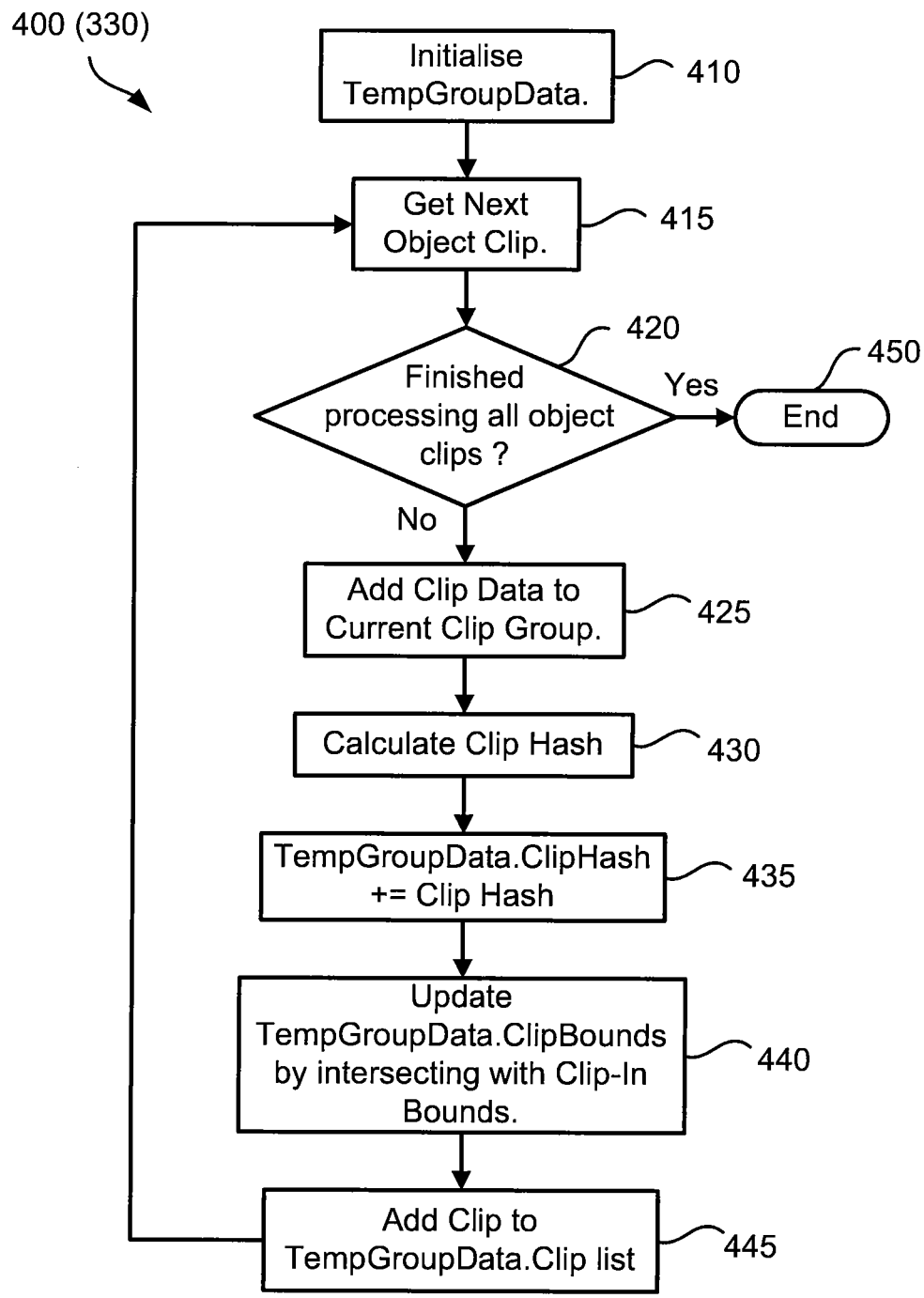
FIG. 4 is a schematic flow diagram illustrating a method of processing object clips as used in the method of FIG. 3.

A method 400, as used in step 330 of the method 300, will now be described with reference to FIG. 4. Method 400 begins at step 410 where the variable TempGroupData is initialised by setting its fields as follows:
ClipBounds to the page bounds (ie: TempGroupData.ClipBounds:=page bounds);
ClipHash to 0 (ie. TempGroupData.ClipHash:=0);
Clip to an empty list (TempGroupData.Clip list;+empty).
At the next step 415, the next clip for the current object is obtained. Step 420 tests whether all clips (ie. the clipping status) for the current object have been processed. If so, the method 400 ends at step 450. Otherwise, method 400 at step 425 adds data for the current clip to a current clip group. The clip data added in step 425 is all the data required for rendering the current clip, principally its edges, levels and fill rules. At the following step 430, method 400 calculates a hash value from the current clip. The clip hash value is preferably unique to the current clip, in that any difference in the clip data results in a different hash value. The method 400 preferably uses the memory address of the current clip in the current clip group as the hash value, provided the system is adapted to save and retrieve previously processed clips. Step 435 then adds the clip hash value to the ClipHash field of TempGroupData. Method 400 then proceeds to step 440, where the ClipBounds field of TempGroupData is updated by intersection with the bounds of the current clip only if the current clip is a clip-in. Finally step 445 adds a pointer to the current clip in the current clip group to a TempGroupData.Clip list, before method 400 returns to step 415 to process the next clip for the current object.

Figure 7:
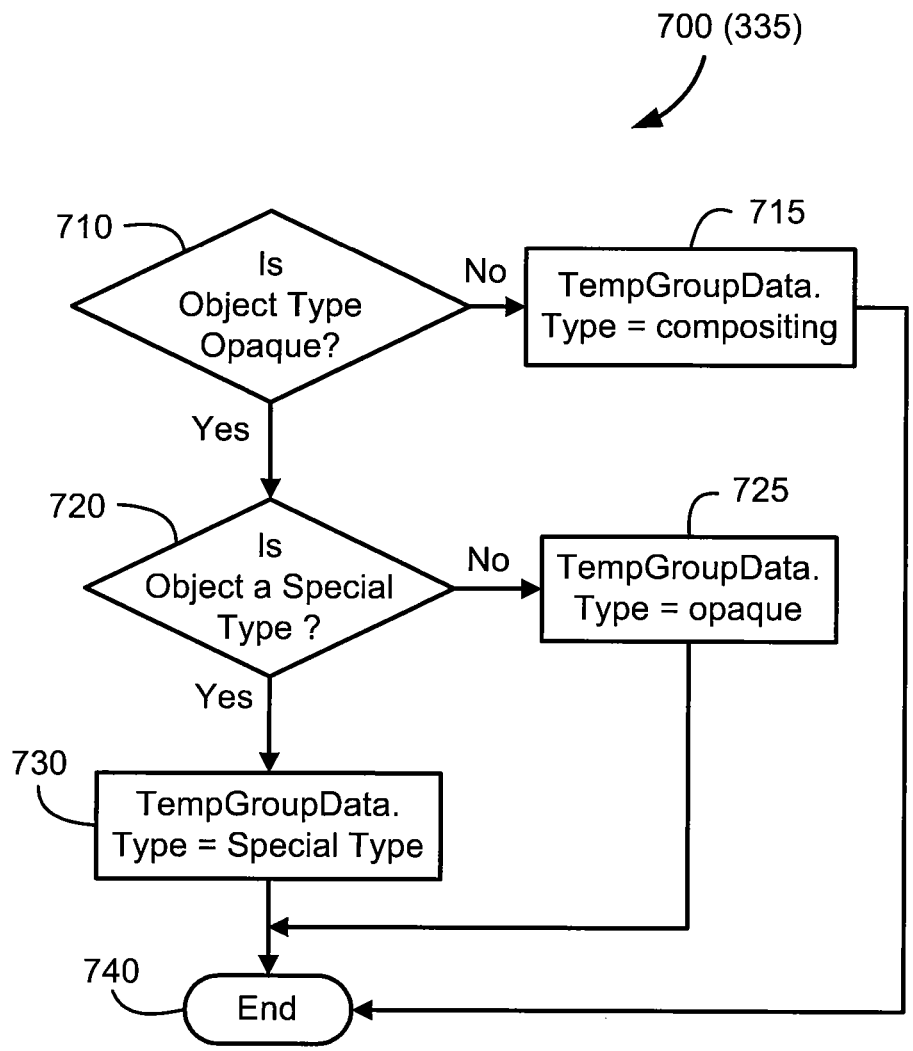
FIG. 7 is a schematic flow diagram illustrating a method of determining a group type for the current object, as used in the method of FIG. 3.

Method 700, as used in step 335 of method 300, will now be described with reference to FIG. 7. Method 700 begins at step 710 where, if the current object is semi-transparent, i.e. non-opaque, the group type field of TempGroupData is set to 'compositing' at step 715 and method 700 ends at step 740. Otherwise, if the current object is of a 'special' type, determined at step 720, the group type field of TempGroupData is set to that special type at step 730 and method 700 ends at step 740. Examples of the 'special' type are 'black text character' and 'thin line', each of which is suitable to be rendered by an optimised renderer specific to that type. Otherwise, the group type field of TempGroupData is set to 'opaque' at step 725, and method 700 ends at step 740.

Figure 5:
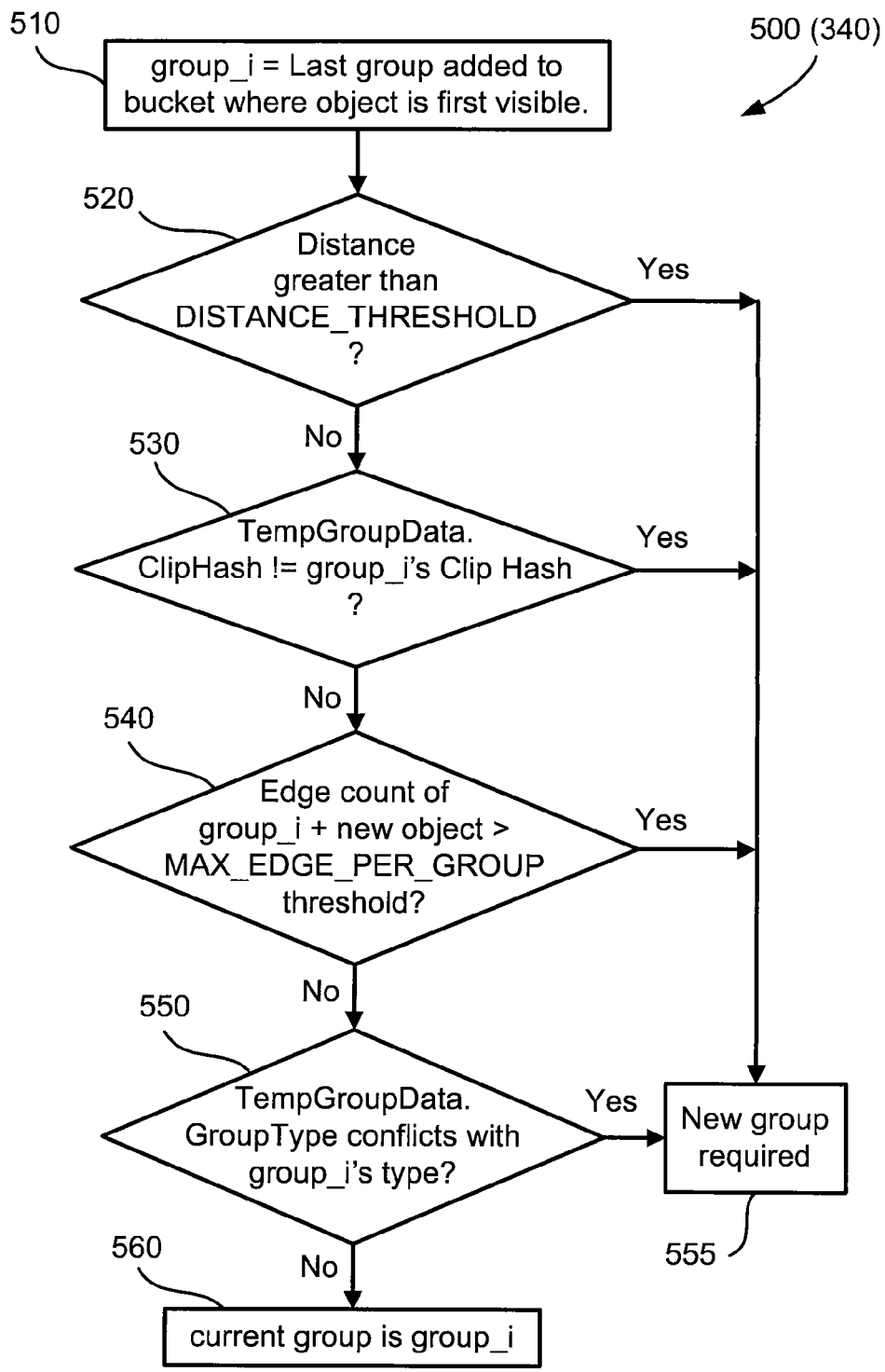
FIG. 5 is a schematic flow diagram illustrating a method of determining whether a new group is needed for an object, as used in the method of FIG. 3.

Method 500, as used in step 340 of method 300, will now be described with reference to FIG. 5. Method 500 begins at step 510 which identifies the highest priority object group added to the first bucket in which the current object is visible and assigns it to the variable group_i. The first bucket in which the current object is visible is calculated and clamped to the range [0, NUMBER_OF_BUCKETS−1] in similar fashion to steps 350 and 355. At the following step 520, the distance between the current object's bounds and group_i's bounds is compared with a value DISTANCE_THRESHOLD. The value of DISTANCE_THRESHOLD is predetermined using profile-guided optimisation, with the aim of limiting the spatial size of each group to maintain efficient renderability. The distance is calculated as a ratio of the sum of the area of the bounding box of group_i with the area of the bounding box of current object, and the area of the combined bounding box of group_i and the current object. If the distance is greater than DISTANCE_THRESHOLD, the current object cannot be added to group_i, and execution proceeds to step 555 from where method 500 returns to step 390 to open a new group for the current object. If not, method 500 next tests, at step 530, whether the ClipHash field value of group_i is equal to that of TempGroupData. If the values are not equal, the current object cannot be added to group_i because their clip lists are not the same, and method 500 proceeds to step 555 described above. If the values are equal, then method 500 proceeds to step 540 where the sum of the edge count of group_i and the number of edges of the current object is compared with a value MAX_EDGE_PER_GROUP. The value of MAX_EDGE_PER_GROUP is predetermined using profile-guided optimisation, with the aim of limiting the complexity of the groups to an efficiently renderable value. If the sum exceeds MAX_EDGE_PER_GROUP, the current object cannot be added to group_i, and method 500 proceeds to step 555 described above. Otherwise, method 500 tests in step 550 whether TempGroupData.GroupType (set in step 335 according to the type of the current object) conflicts with the group type of group_i. If the group types conflict, the current object cannot be added to group_i, and method 500 proceeds to step 555 described above. Otherwise, method 500 returns to step 345 via step 560, indicating the current object is compatible with last group added to the first bucket in which the current object is visible.

Figure 8:
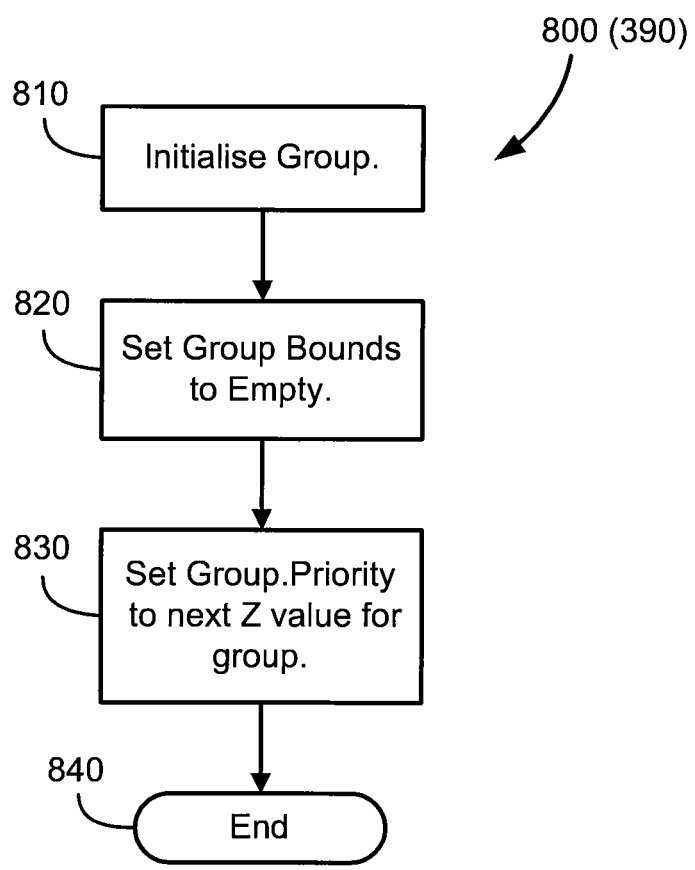
FIG. 8 is a schematic flow diagram illustrating a method of creating a new object group, as used in the method of FIG. 3.

Method 800, as used in step 390 of method 300, will now be described with reference to FIG. 8. Method 800 begins at step 810 where a new group is created and initialised with the previously calculated TempGroupData group type (step 335) and the edge count set to 0. At the following step 820 the bounds of the new group are set to empty. At step 830, the priority of the new group is set to the next higher Z-value than the previously created group. Method 800 then ends at step 840.

Figure 6:
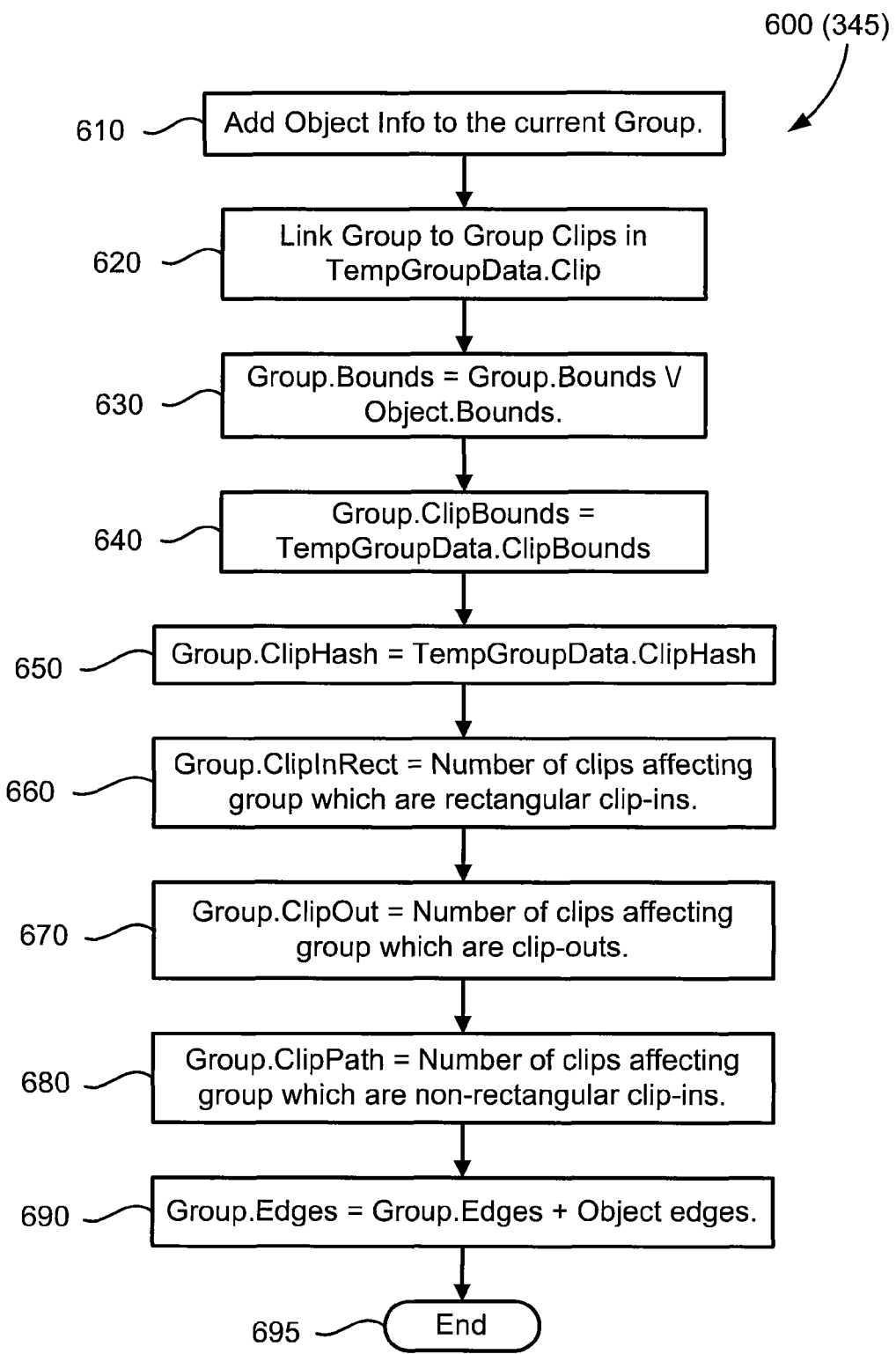
FIG. 6 is a schematic flow diagram illustrating a method of adding the current object information to a group, as used in the method of FIG. 3.

Method 600, as used in step 345 of method 300, will now be described with reference to FIG. 6. Method 600 begins at step 610 where the object information is added to the current group. The object information added is that which will be required by the RIP module 207, i.e. the object's edges, levels, and fill information. At the next step 620, the current group's clip list is set to the clip list stored in the TempGroupData.Clip list. Step 630 follows, at which the group's bounds are updated by calculating a union with the bounding box of the current object. Execution then proceeds to step 640 where TempGroupData.ClipBounds is copied to the group clip bounds, thus accumulating a clip-in bounding box. Method 600 then in step 650 copies TempGroupData.ClipHash to the group clip hash value. At the next step 660 the group's ClipInRect field is set to the number of clips in the group's clip list that are rectangular clip-ins. Similarly at step 670 the group's ClipOut field is set to the number of clips in the clip list of the group that are clip-outs. At step 680 the ClipPath field of the group is set to the number of clips in the group's clip list that are (non-rectangular) clip-in paths. At step 690, the edge count of the group is incremented by the number of object edges, and method 600 ends at step 695.

A method 900 of rendering a partitioned display list, as created by DL builder module 203 using the method 300, will now be described with reference to FIG. 9. The partitioned display list comprises the list of object groups in each bucket, and the corresponding clip groups. Method 900 is executed by RIP module 207 to generate an output pixel-based image 210, band by band down the page in a bandstore preferably forming part of system memory 3. For each band, method 900 identifies a contiguous range of buckets containing groups that may be visible in the band. Method 900 then creates two "metagroups", which are groups of groups, and stores them in the fields of the variable mg. A metagroup mg.PSR comprises the groups of object data in the current bucket range visible in the current band that are of lower or same priority as the lowest-priority visible compositing group for the current band. In keeping with the hybrid rendering method mentioned above, this metagroup is rendered using a pixel-sequential renderer. A metagroup mg.RCCR comprises the remaining groups visible in the current band. A metagroup is therefore a subset of visible object data. Since these groups do not require compositing, either pixel-sequential or object-sequential rendering may be used to render this metagroup. The rendering method for the second metagroup according to the embodiment handles clipping efficiently by reducing the amount of clip count updating and using the specialised renderers known as "Ripettes" where possible. For this reason, the present approach is referred to by the present inventors as the "Ripette & Clip-Centric Rendering" (RCCR) method.

Method 900 starts at step 910 where two index variables, start_bucket and end_bucket, are initialised to 0. If, as tested at step 920, all bands have been rendered, method 900 ends at step 930. Otherwise, at the next step 940, the current band to be rendered is commenced. At step 950 the index variable end_bucket is set to the maximum scanline number in the current band multiplied by NUMBER_OF_BUCKETS, and integer divided by the page height in scanlines. This value is the index of the last bucket containing groups that might be visible in the current band. This identifies the last bucket which needs to be looked at in a range based on the band being rendered. The values start_bucket and end_bucket now delineate a contiguous range of buckets containing groups that may be visible in the current band.

Method 900 then proceeds to step 960 where metagroups are created and stored in metagroup fields named PSR and RCCR of the variable mg. Step 960 is described in detail below with reference to FIGS. 10($i$) to 10($iii$). The next step 970 firstly renders the metagroup mg.PSR using a pixel-sequential rendering (PSR) approach, as described in more detail below with reference to FIG. 11. Subsequently, the metagroup mg.RCCR is rendered in step 980 using a ripette & clip-centric renderer as described below with reference to FIG. 12. Method 900 then returns to step 920 to check whether there are any more bands to be rendered.

FIGS. 10A and 10B contain a flowchart illustrating the method 1000 of creating metagroups as used in step 960 of method 900. It is within the method 1000 that object data within the band being rendered and identified as visible is analysed. This analysis is used to permit selecting at least one rendering method from a plurality of rendering methods by which the band is to be rendered. The method 1000 starts at step 1010 where the bucket pointers are initialised using the method 1300 described in FIG. 13.

Figure 13:
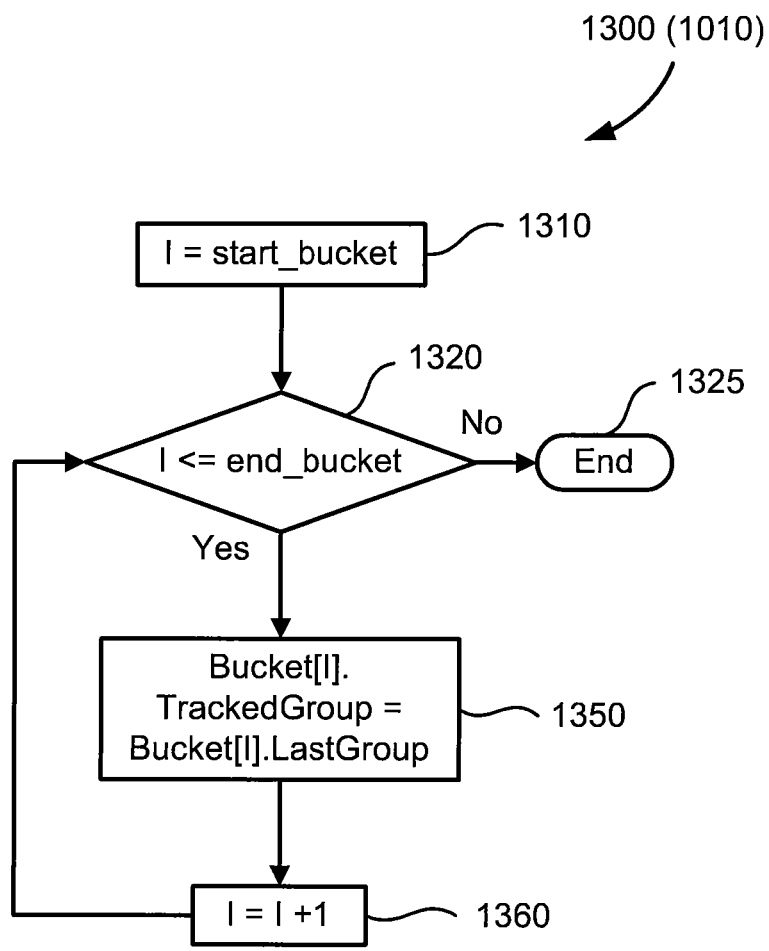
FIG. 13 is a schematic flow diagram illustrating a method of initialising the bucket pointers, as used the method in FIGS. 10($i$) to 10($iii$)

FIG. 13 a schematic flow diagram illustrating the method 1300 of initialising the bucket pointers, which is used in method 1000. Method 1300 starts at step 1310 where a variable I is initialised to start_bucket. At step 1320, if I is less than or equal to end_bucket, the method 1300 proceeds to step 1350, otherwise all pointers have been initialised and the method 1300 ends at step 1325. At step 1350, the bucket I's TrackedGroup points to the last group in the bucket I and method 1300 proceeds to step 1360. At step 1360, the variable I is incremented and execution returns to step 1320.

Returning to FIG. 10($i$), following step 1010, the method 1000 proceeds to step 1012. In step 1012, a variable K is assigned to start_bucket, and variables HP and HPI are assigned to the smallest integer value representable in the rendering apparatus 20 and −1 respectively. At the next step 1014, K is compared to end_bucket and if greater, execution proceeds to step 1028. Otherwise, in step 1016, the TrackedGroup variable of Bucket[K] is tested for validity. If invalid, method 1000 proceeds to step 1026 where K is incremented, and execution returns to step 1014. Otherwise, step 1018 tests whether TrackedGroup is visible in the current band, by intersecting its Bounds and ClipBounds fields with the current band bounds. If the intersection is empty, TrackedGroup is not visible in the current band, and method 1000 proceeds to step 1024. In step 1024, TrackedGroup is advanced to the previous group in the list of groups of Bucket [K] by assigning it to the value of its own Prev field. If TrackedGroup is visible in the current band, the priority of the group pointed to by TrackedGroup is compared with the current value of HP in step 1020. If greater, HP is reassigned to the priority of the group pointed to by TrackedGroup and HPI is set to K at step 1022 and execution proceeds to step 1026 described above. Otherwise, step 1026 is executed directly bypassing step 1022.

Steps 1014 through to 1026, calculate bucket index HPI such that the group pointed to by TrackedGroup variable of Bucket[HPI] is the highest priority group that is visible in the current band in the current range of buckets start_bucket to end_bucket. If HPI is −1, then no visible groups were found in the current band. These steps effectively identify the highest priority graphic object data, in tracked groups of objects, visible in the band to be rendered from that subset of the buckets that are active, or have objects that are active for display, in that band of the image.

Once step 1014 return no, step 1028 (seen in FIG. 10(*ii*)) then checks whether the index HPI has been assigned or the group pointed to by the TrackedGroup variable of Bucket [HPI] is a compositing group. If true, step 1038 is executed where the LHPI is calculated as the priority of the group pointed to by variable TrackedGroup of Bucket[HPI]. If HPI was −1 then LHPI is also set to −1. The value −1 means no buckets in the current bucket range contain any visible groups in the current band. The method 1000 then continues at step 1041 in FIG. 10(*ii*) for creating the mg.PSR metagroup. Otherwise, step 1030 in FIG. 10(*ii*) adds the group pointed to by the TrackedGroup variable of Bucket[HPI] to the metagroup mg.RCCR. This effectively re-orders a subset of visible objects data across a number of buckets depending on the rendering requirements of the object data. At the following step 1032, method 1000 tests whether the group pointed to by the TrackedGroup variable of Bucket[HPI] is visible in the next band, by intersecting its Bounds and ClipBounds fields with the next band bounds. If not visible, the group pointed to by the variable TrackedGroup of Bucket[HPI] is removed at step 1034 as the group pointed to by the TrackedGroup variable of Bucket[HPI] cannot be visible in any band after the current band. Otherwise, or after step 1034, the TrackedGroup variable of Bucket[HPI] is advanced at step 1036 to point to the previous group in Bucket[HPI]'s list by assigning it to the value of its own Prev field. Execution then returns to step 1012 in FIG. 10(*i*) to once again traverse the current bucket range.

Upon reaching step 1041, and as seen in FIG. 10(*ii*), the metagroup mg.RCCR contains, if any, all groups of higher priority than the highest priority visible compositing group, if any, that are visible in the current band, sorted in ascending priority order.

At step 1041 in FIG. 10(*ii*), J is set to the start_bucket. In step 1042, J is compared to end_bucket. If J is greater than end_bucket, method 1000 proceeds to step 1062. In step 1062, the method 1000 updates the first bucket which needs to be looked at in a range, when all object data within the first bucket has already been rendered. Otherwise, execution proceeds from step 1042 to step 1044 where a TrackedGroup field of the Bucket[J] is set to point to the group pointed to by the FirstGroup field of Bucket[J]. TrackedGroup is then tested for validity at step 1046 in FIG. 10(*iii*). If it is invalid, i.e. the end of the list of groups in Bucket[J] has been reached, J is incremented at step 1048 and method 1000 returns to step 1042 in FIG. 10(*ii*). Otherwise, the priority of TrackedGroup is compared with the value of LHPI set at step 1038. If the priority of TrackedGroup is greater, step 1048 follows where J is incremented to move to the next bucket. Otherwise, execution proceeds to step 1052 which tests whether the group pointed to by TrackedGroup is visible in the current band, by intersecting its Bounds and ClipBounds fields with the current band bounds. If the intersection is empty, TrackedGroup is not visible in the current band, and method 100 proceeds to step 1060. Steps 1018 and 1052 have the effect of filtering out invisible object data for the current band being rendered, with steps 1016 and 1018 also being effective when rendering objects sequentially.

In step 1060, TrackedGroup is then advanced to point to the next group in Bucket[J]'s list by assigning it to the value of its own Next field, and execution returns to step 1025. Otherwise, the group pointed to by TrackedGroup is added to the metagroup mg.PSR at step 1054. At the next step 1056, the group pointed to by TrackedGroup's visibility in the next band is tested in similar fashion to step 1032. If it is not visible, the group pointed to by TrackedGroup is removed from bucket J at step 1058 as already rendered, as the group pointed to by TrackedGroup cannot be visible in any band after the current band. Then, or otherwise, execution proceeds to step 1060 described above. The effect of steps 1041-1060 is to render, from a range of buckets, visible object data less than a determined priority using a pixel sequential approach.

After steps 1041 to 1060 in FIGS. 10(*ii*) and 10(*iii*), the metagroup mg.PSR contains, if any, all groups of priority less than or equal to the highest priority visible compositing group that are visible in the current band, in random order.

Figure 11:
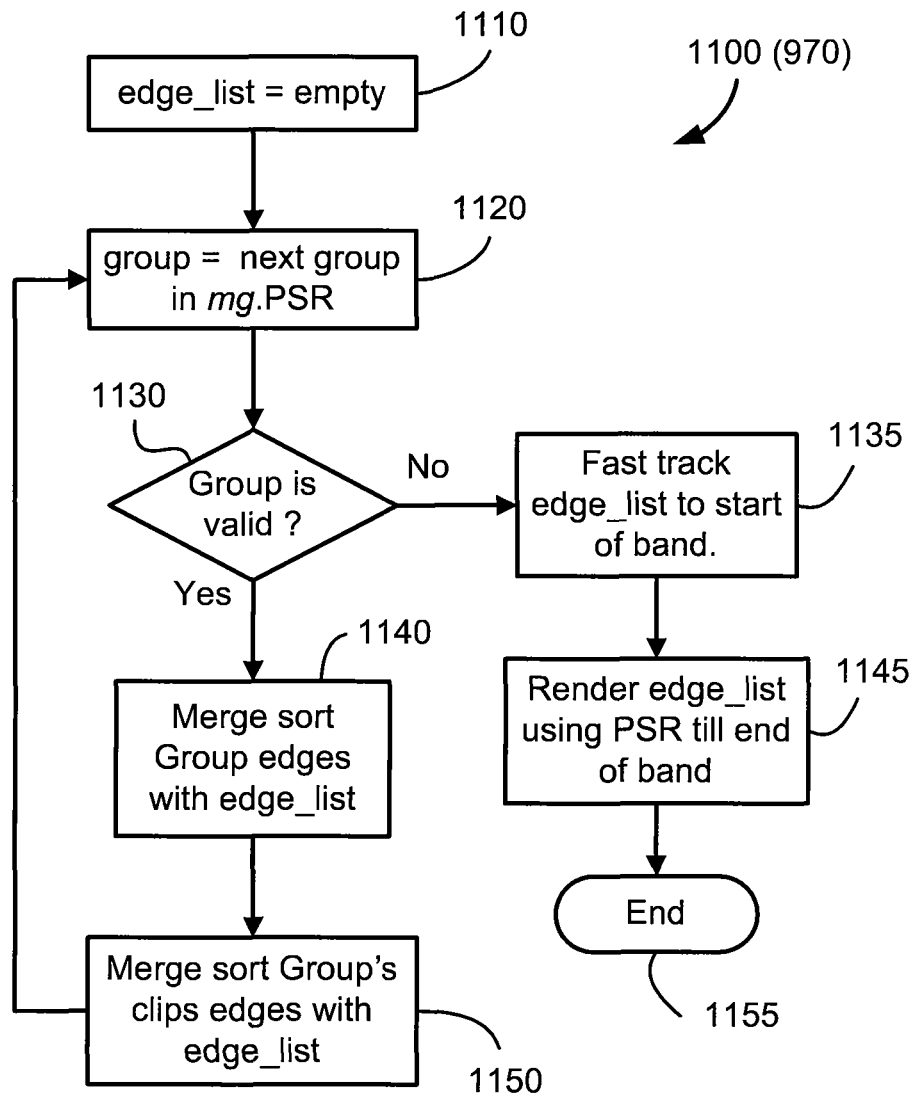
FIG. 11 is a schematic flow diagram illustrating a method of rendering a metagroup using a pixel-sequential renderer, as used in the method of FIG. 9.

A method 1100, of rendering the metagroup mg.PSR using a pixel-sequential renderer, as used in step 970 of method 900, will now be described with reference to FIG. 11. Method 1100 starts in step 1110, where a variable edge_list is initialised to empty. At the next step 1120, the current group is assigned to be the next group in the metagroup mg.PSR. Method 1100 then tests at step 1130 whether the current group is valid. If so, execution proceeds to step 1140; otherwise, to step 1135. At step 1140, the edges in the current group (assigned in step 345) are merge-sorted into the edge_list. The effect of merge-sorting is that edge_list ends up sorted in ascending order of y, then of x. At the next step 1150, the clip edges of the current group (which were added to the clip group corresponding to the current group in step 425) are merge-sorted into edge_list. To avoid redundancy, the edges of the same clip should not be added more than once to a single edge_list. Note that steps 1140 and 1150 preferably avoid adding object or clip edges that start beyond the end of the current band to edge_list, as the corresponding objects or clips have no effect in the current band. Execution then returns to step 1120.

At step 1135, the sorted edge_list is "fast-tracked" to the start of the current band. This is done by determining the intersection of each edge with the first scanline in the current band and updating the x position of the edge accordingly. This is achieved by using the linear equation of a line to find the edge position at the first scanline in the current band. Any edges that do not reach the first scanline in the current band can simply be discarded. "Fast tracking" avoids the need to process all scanlines before the first scanline in the current band. This greatly reduces the processor effort that is needed to start rendering from the first scanline in the current band and hence speeds up the rendering process when there are edges that start outside the current band.

The method 1100 then proceeds to step 1145 where edge_list is rendered to the bandstore using a pixel-sequential renderer as well known in the art. The method 1100 then ends at step 1155.

Figure 12:
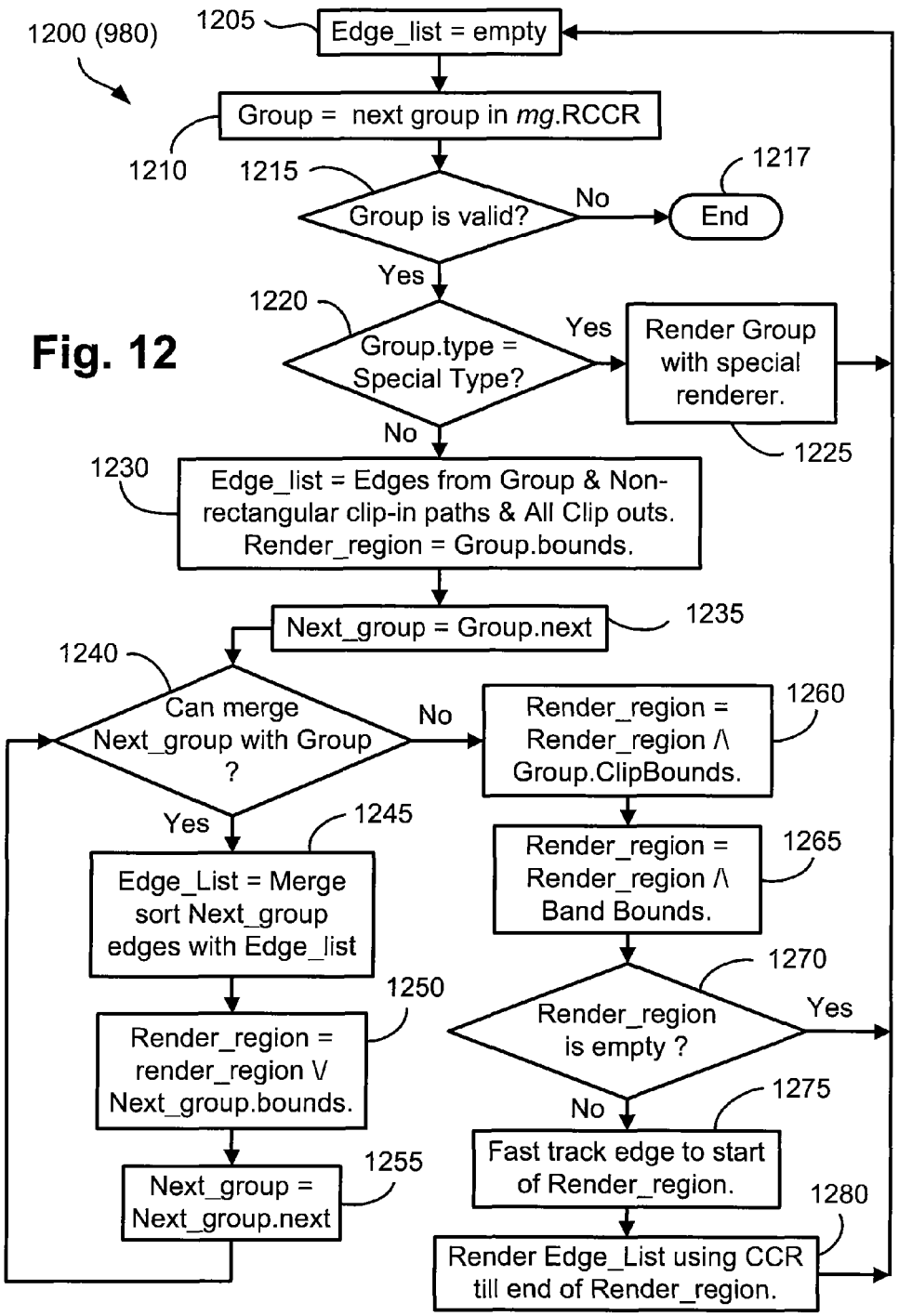
FIG. 12 is a schematic flow diagram illustrating a method of rendering a metagroup using a Ripette & Clip-Centric renderer, as used in the method of FIG. 9.

A method 1200, of rendering the metagroup mg.RCCR using a ripette & clip-centric renderer, as used in step 980 of method 900, will now be described with reference to FIG. 12. Method 1200 starts in step 1205 where a variable edge_list is initialised to empty. At the next step 1210, the current group is assigned to be the next group in the metagroup mg.RCCR. Method 1200 then tests at step 1215 whether the current group is valid; if so, execution proceeds to step 1220; otherwise, to step 1217 where method 1200 ends.

At step 1220, the method 1200 tests whether the current group is of a 'special' type as tested at step 720. If so, step 1225 renders the current group using a selected corresponding 'special' renderer or "Ripette" forming part of the RIP module 207. Execution then returns to step 1205.

If the current group is not of 'special' type, step 1230 follows. In step 1230, edge_list is assigned to the object edges from the current group (assigned in step 345) along with the edges of any non-rectangular clip-in paths and all clip-outs (both of which were obtained from the group fields assigned in method 600). A variable render_region is assigned to the bounds of the current group. At the next step 1235, the method 1200 assigns a variable next_group to the group following the current group in the metagroup mg.RCCR, if such exists. Then at step 1240, method 1200 tests whether the current group can be merged with next_group. If not, as seen in FIG. 12, execution proceeds directly to step 1260. Step 1240 involves checking whether the groups have the same ClipHash value (as at step 530), same Group type (as at step 550) and that the number of edges in edge_list does not exceed MAX_NO_EDGES_PER_RENDER_TASK. The value of MAX_NO_EDGES_PER_RENDER_TASK is predetermined using profile-guided optimisation, and with the aim of maximising cache usage. If it is determined that the current group can be merged with next_group, step 1245 follows where the object and clip edges in the next group are merge-sorted into the edge_list (as in step 1140). Note that steps 1230 and 1245 preferably avoid adding object or clip edges that start beyond the end of the current band to edge_list, as the corresponding objects or clips have no effect in the current band. At the following step 1250, the render region is extended by a union with the bounds of next_group. Method 1200 proceeds to assign next_group to the group following next_group at step 1255, then returns to step 1240.

If step 1240 determines that the current group cannot be merged with next_group, execution proceeds to step 1260 where the render region is intersected with the clip bounds of the current group. Step 1265 follows, where render_region is intersected with the current band bounds. If the resulting render_region is empty, as determined at step 1270, the method 1200 returns to step 1205. Otherwise, the sorted edge_list is "fast-tracked" at step 1275 to the start of the visible render_region as described above with reference to step 1135. At the next step 1280, edge_list is rendered within Render_Region using Ripette & Clip-Centric Rendering (RCCR) as described below, before execution returns to step 1205 to consider the next group in the metagroup mg.RCCR.

In one arrangement, the RCCR is a pixel-sequential RIP that processes clip paths in the method now described. Prior to rendering, each graphic object to be rendered by the pixel-sequential RCCR is given a Boolean attribute IsClipPath. Clip path objects have their IsClipPath member set to TRUE. Other objects have their IsClipPath member set to FALSE.

The pixel-sequential RCCR stores a global constant NumClipPaths, which is initialised to the value ClipPathCount obtained from summing the ClipPath fields of the groups to be rendered. The pixel-sequential RCCR also stores a variable CurrentClipPathCount, which is initialised to zero at the start of each scanline in render_region.

During rendering of each scanline in render_region, if an object is activated that has IsClipPath set to TRUE, then the variable CurrentClipPathCount is incremented. If an object is deactivated that has IsClipPath set to TRUE, then the variable CurrentClipPathCount is decremented.

Before compositing the pixels of objects that contribute colour between two edges, the CurrentClipPathCount and NumClipPaths variables are compared. If these values are not equal, then no pixels are output between this edge pair, since pixels only appear when all clip paths are active. Otherwise, if these values are equal, then the pixels of objects that contribute colour to the span of pixels between the edge pair are composited and output.

In an alternative arrangement, the RCCR is selected as a Painter's algorithm RIP. In this arrangement, any clip paths present on the clip stack are processed using active edge list techniques, well known to those skilled in the art. For each scanline in render_region, for each edge pair, when all clip paths are activated, the span between the edge pair is stored in a span list, R. The span may be stored as a tuple (scanline, start-x, end-x) or as a single scanline-high rectangle where the (left, top) coordinate is (start-x, scanline) and (right, bottom) coordinate of the rectangle is (end-x, scanline+1). Before the span is added to the span list, R, it is intersected with the rectangle defined by render_region. If the result is non-empty, then the span is added to span list R. The result is a set of spans, R, defining which pixels of the graphic objects in G may be output to the frame store. Each graphic object is then rendered to the band store in turn, such that only those pixels lying in the set of spans, R, are output.

In a further alternative, buckets contain more than one list of groups. Each list has a currently active group. When adding an object to a group in a bucket, the most appropriate active group is chosen for the object. For example, it is advantageous to rendering performance for groups to be as spatially compact as possible.

In another alternative, multiple band stores are allocated within memory. The various renderers operate as independent parallel threads rendering the partitioned display list to separate bandstores simultaneously.

Figure 14B:
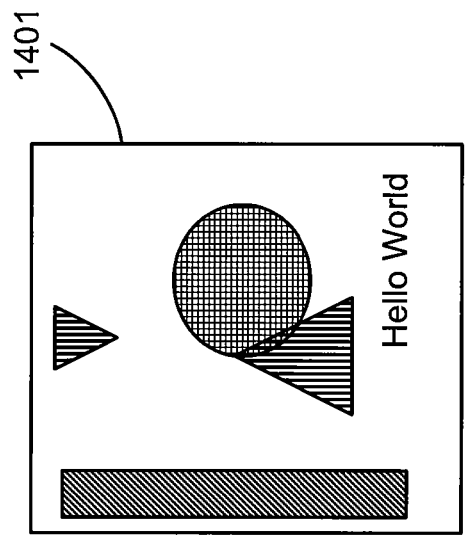
Figure 14A:
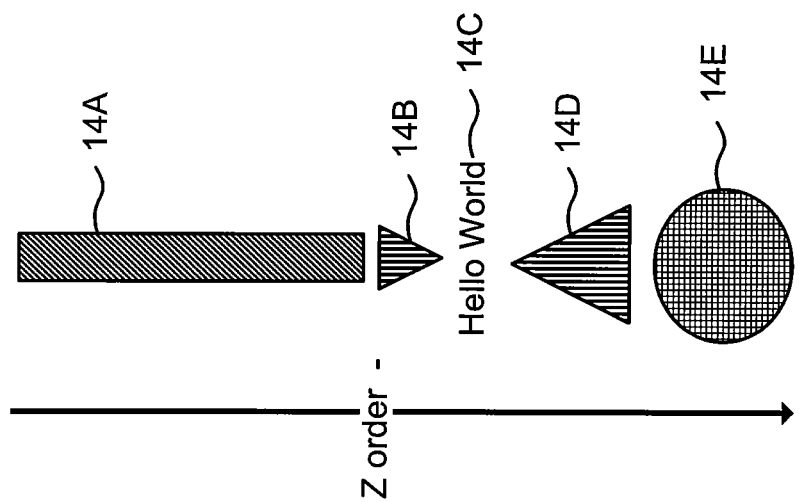

FIGS. 14A to 16B will now be described to illustrate operation of banded hybrid rendering according to the present disclosure. FIG. 14B shows a particular page 1401 resulting from banded hybrid rendering. The page 1401 in this example has 5 objects arranged in the following Z-order, as illustrated in FIG. 14A:

(i) a long opaque rectangular object 14A which extends down the page 1401;

(ii) an upside (pointing) down opaque triangle 14B near the top of the page 1401;

(iii) an opaque bitmap glyph text 'Hello World' 14C near the bottom of the page 1401;

(iv) an opaque triangle 14D near the centre of the page 1401; and (v) a compositing circle 14E, also near the centre of the page 1401.

The actual layout of the page 1401 is seen in FIG. 14B. The PDL Interpreter module 201 in FIG. 2 operates to send each of the 5 objects 14A-14E to the DL Builder Module 203 for creating a corresponding bucket partitioned display list.

For this example, let us assume that the NUMBER_OF_BUCKETS is set to 3 and that every object the PDL Interpreter module 201 sends to the DL Builder Module 203 creates a separate group and none of the objects have an associated clip. It follows therefore that decision step 340 in FIG. 3, of whether the new object requires a new group, will always return Yes in this example. The first object 14A sent from the PDL Interpreter Module 201 to the DL Builder Module 203 is broken down into edges and level. The group type is set to opaque. A corresponding Group 14A is formed and put in bucket 0. Note, that Group 14A extends down the page 1401 and thus into buckets 1 and 2 but is only put into bucket 0 as the first visible scanline for object 14A is in the Y extents of bucket 0. Also in this example, first_bucket→FirstGroup (step 385) and first_bucket→LastGroup (step 375) as determined from FIG. 3 for bucket 0, which now points to Group 14A. All other objects are processed in a similar fashion. Object 14B is processed into opaque Group 14B and inserted into bucket 0. Object 14C is processed into special opaque black bitmap text Group 14C and inserted into bucket 2. Object 14D is processed into an opaque Group 14D and inserted into bucket 1. The last object 14E is processed as a composting group 14E and inserted also into bucket 1.

In FIG. 15B, the page 1401 is represented 1502 as divided into buckets. FIG. 15A at 1501 shows the ordering of the display list for each bucket. All groups within each bucket are Z-ordered.

Figure 16A:
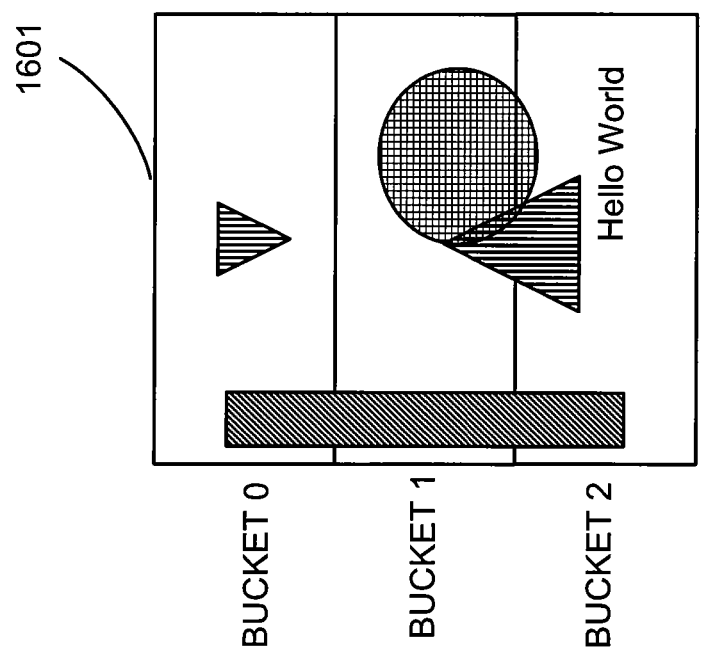
Figure 16B:
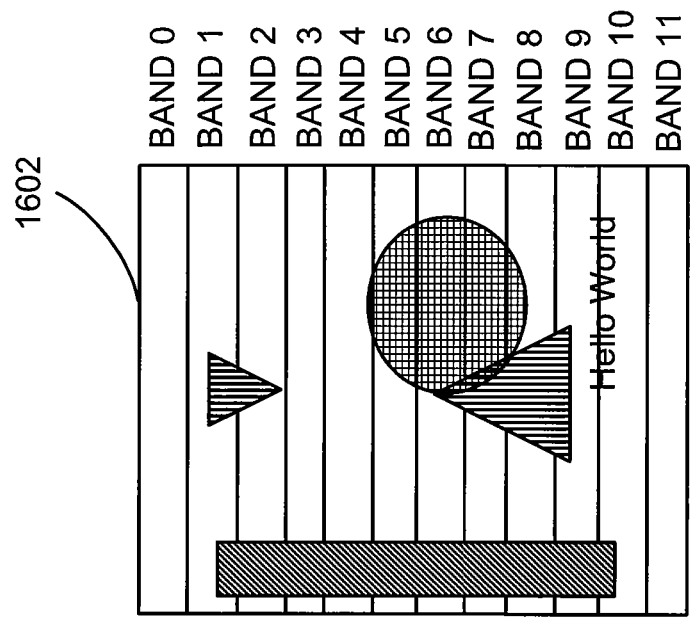

Now the display list has been completed, rendering can then proceed. For this example, assume the page is rendered into 12 bands of equal sizes. FIG. 16A at 1601 shows the page 1401 completely rendered but divided into buckets. FIG. 16B at 1602 shows the page completely rendered but divided into the 12 bands. At the start of rendering, start_bucket is set to 0 and end_bucket is also set to 0. As band 0 is about to be rendered, the application software calculates the end_bucket to be 0 based on the last scanline that will be rendered in Band 0. The application software then calculates the meta groups mg.PSR and mg.RCCR according to step 960 of FIG. 9, using the method 1000 described in FIGS. 10A and 10B. Both meta groups will be empty for the first bucket as no group has a visible region is within Band 0. White or nothing, representing the blank background of the page 1401, depending on the system setup, will be rendered in Band 0. Start bucket remains unchanged at the end of Band 0 as there are still groups in bucket 0.

Rendering Band 1, end_bucket is set to 0. The meta groups are created with mg.PSR being empty as there are no compositing objects, while mg.RCCR contains Groups 14A and 14B both of which are opaque. mg.RCCR will be rendered using the method 1200 described in FIG. 12. start_bucket will remain unchanged. No groups in bucket 0 will be removed as all groups are visible in at least Band 2.

Rendering Band 2, end_bucket is set to 0. mg.PSR will remain empty while mg.RCCR contains Groups 14A and 14B, both of which are opaque. Group 14B will be removed from the bucket 0 to avoid looking at it for future bands as the last visible scanline of Group 14B is in Band 2. The rendering method 1200 in FIG. 12 will be used again. Start_bucket will not change as Group 14A remains visible in Band 3.

Rendering Band 3, end bucket is set to 0. mg.PSR will remain empty while mg.RCCR contains only Group 14A which is opaque. The rendering method 1200 in FIG. 12 will be used again. Start_bucket will not change as Group 14A remains visible in Band 4.

Whilst rendering Band 4 and Band 5, end bucket is set to 1. mg.PSR will contain Groups 14A and 14E) as Group 14E has a higher Z-value over Group 14A, while mg.RCCR will be empty. While Group 14D is also in bucket 2, that group is ignored for rendering Bands 4 and 5 as such is not visible yet. The rendering method 1100 in FIG. 11 will be used for rendering mg.PSR. Start_bucket will not change as Group 14A remains visible in the next Band.

When rendering Band 6 and Band 7, end bucket is set to 1. mg.PSR will contain Groups 14A, 14D and 14E, while mg.RCCR will be empty. The rendering method 1100 of FIG. 11 will be used for rendering mg.PSR. Start_bucket will not change as Group 14A remains visible in next Band.

For rendering of Band 8, end bucket is set to 2. mg.PSR will contain Groups 14A, 14D and 14E, while mg.RCCR will be empty. Group 14E is no longer visible in future bands so it is removed from bucket 1. Also note, even though end bucket is at bucket 2, Group 14C is not added to either meta group as it is not visible in Band 8. The rendering method 1100 of FIG. 11 will be used for rendering mg.PSR. Start_bucket will not change as Group 14A remains visible in next Band.

For rendering of Band 9, end bucket is set to 2. mg.PSR will be empty as no compositing is required for this band, while mg.RCCR will contain Groups 14A, 14C and 14D. Group 14D is removed from bucket 1 as it is not visible in Band 10. The rendering method 1200 of FIG. 12 will be used for mg.RCCR. Start_bucket will not change as Group 14A remains visible in next Band.

For rendering Band 10, end bucket is set to 2. mg.PSR will be empty, while mg.RCCR will contain Groups 14A and 14C. Both groups are no longer visible in Band 11, so Group 14A is removed from bucket 0 and Group 14C is removed from bucket 2. The rendering method 1200 of FIG. 12 will be used for mg.RCCR. Start bucket is moved to the first bucket that has groups left to be rendered. In this case, there are no buckets left to be rendered.

For rendering of Band 11, end bucket is set to 2. Both mg.PSR and mg.RCCR will be empty as no groups are left in any buckets.

Figure 9:
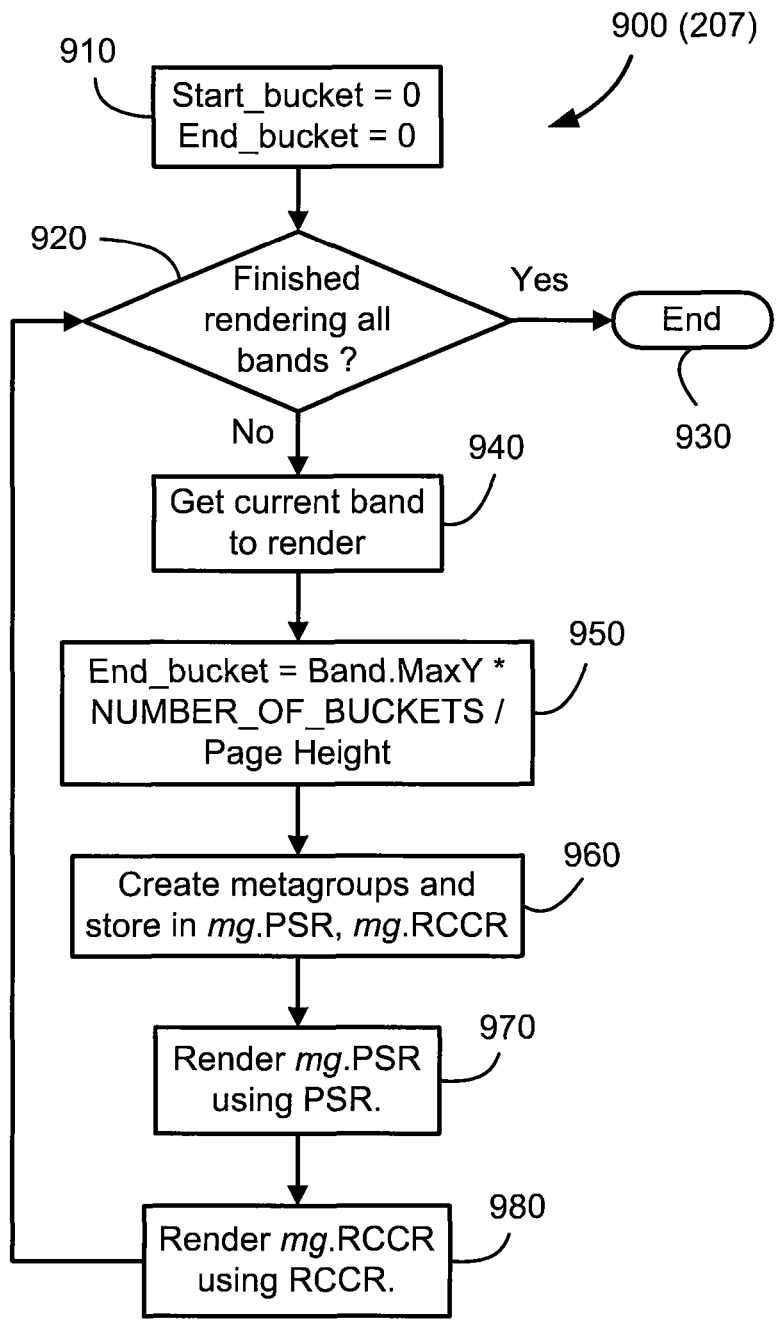
FIG. 9 is a schematic flow diagram illustrating a method of rendering a partitioned display list constructed according to the method of FIG. 3.

All bands for the page 1401 have therefore been rendered which ends the rendering method at step 930 of the method 900 in FIG. 9.

INDUSTRIAL APPLICABILITY

The arrangements described are applicable to the computer and data processing industries and particularly for the rendering of pages of graphic object data in an efficient manner.

The foregoing describes only some embodiments of the present invention, and modifications and/or changes can be made thereto without departing from the scope and spirit of the invention, the embodiments being illustrative and not restrictive.

The claims defining the invention are as follows:

1. A method of band rendering an image, said method comprising the steps of:
   receiving object data of the image in a page description language;
   determining a plurality of buckets by which the object data is to be divided;
   assigning object data of each object in the image to one of the plurality of buckets based on an initial visibility of the object in the image; and
   for each band, whose size is different from a size of each of the buckets, in a band sequential fashion:
   identifying object data visible within a band from a subset of the plurality of buckets active for the band;

analyzing a type of the identified object data within the band, the type of identified object data to be analyzed being one of opaque and compositing;

selecting at least one rendering method from a plurality of rendering methods including a pixel sequential rendering method, by which the band is to be rendered, based on the analyzed type of the identified object data; and rendering the identified object data into the band from the object data using the selected at least one rendering method.

2. A method according to claim 1, wherein said rendering comprises sorting object data within the subset of buckets active for the band.

3. A method according to claim 1, wherein some of the identified object data is firstly rendered using the pixel sequential rendering method and other identified object data is subsequently rendered using at least one further rendering method.

4. A method according to claim 1, wherein a display list is interpreted from the page description language and is partitioned into the buckets, or a separate display list is interpreted from the page description language for each bucket.

5. A method according to claim 1, further comprising the step of dividing the page into a plurality of bands.

6. A method according to claim 1, wherein the buckets divide the page into corresponding partitions of scanlines.

7. A method according to claim 1, the object data is defined in z-order.

8. A method according to claim 1, wherein a number of the buckets is determined based on a characteristic of the page.

9. A method according to according to claim 1, wherein said analyzing further comprises analyzing the object data to identify the highest priority visible compositing object data.

10. A method according to claim 1, wherein said analyzing further comprises filtering out invisible object data for the current band being rendered.

11. A method according to claim 1, wherein object data for two or more graphic objects from the page description language are grouped into groups within a bucket using a grouping criteria.

12. A method according to claim 1, wherein said analyzing further comprises calculating visibility of object data using the intersection of (i) a bounding of the object, with (ii) a union of the bounding boxes of clip-ins, and (iii) with a bounding box of the band being rendered.

13. A method according to claim 1, further comprising the step of removing object data of a graphic object from the one bucket once the object data to be removed is not visible in subsequent bands.

14. A method according to claim 1, wherein said analyzing further comprises re-ordering a subset of visible object data across a plurality of buckets depending on the rendering requirements.

15. A method according to claim 1, wherein said rendering comprises rendering from a range of buckets, visible object data less than a determined priority using a pixel sequential approach.

16. A method according to claim 1, wherein said analyzing further comprises updating a first bucket which needs to be looked at in a range, when all object data within the first bucket has already been rendered.

17. A method according to claim 1, wherein said rendering further comprises determining a last bucket which needs to be looked at in a range based on the band being rendered.

18. A method according to claim 1, wherein said assigning further comprises, for each clip affecting object data of a graphic object, accumulating a clip-in bounding box.

19. A method according to claim 1, further comprising determining the type of the object data based on characteristics of the object being rendered.

20. A method according to claim 11, further comprising setting a unique Z-value for each object data group.

21. A method according to claim 1, wherein said rendering comprises rendering a subset of object data from a range of buckets using at least one of object sequential rendering or Painter's rendering.

22. A method according to claim 1, wherein a special rendering method is selected if the type of the identified object is a corresponding special type.

23. A method according to claim 1, wherein the plurality of rendering methods includes clip-centric rendering methods.

24. An apparatus configured for implementing the method according to claim 1.

25. A non-transitory computer storage medium having computer program code stored thereon, the code being formed as software modules configured for execution by a processor to implement the method according to claim 1.

26. A printer comprising the apparatus according to claim 24.

27. A printer comprising the computer storage medium according to claim 25.

* * * * *